(12) United States Patent
Shimizu et al.

(10) Patent No.: US 6,201,657 B1
(45) Date of Patent: *Mar. 13, 2001

(54) REMOVABLE TYPE MAGNETIC RECORDING/REPRODUCING DEVICE

(75) Inventors: Toshiharu Shimizu, Machida; Yoshihide Majima, Hadano; Toshimitsu Itoh; Hidetsugu Touji, both of Atsugi, all of (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,423

(22) Filed: Jan. 9, 1998

(30) Foreign Application Priority Data

Jan. 14, 1997 (JP) .................................................. 9-004568
Jan. 14, 1997 (JP) .................................................. 9-004717

(51) Int. Cl.[7] .................................................. G11B 19/20
(52) U.S. Cl. ................................. 360/73.03; 360/99.04
(58) Field of Search .................................. 360/69, 73.01, 360/73.02, 73.03, 73.08, 98.07, 99.04, 99.08; 318/268, 272, 276, 277, 278

(56) References Cited

U.S. PATENT DOCUMENTS

| | | | |
|---|---|---|---|
| 4,656,533 | * 4/1987 | Sakai et al. | 360/73.03 |
| 4,680,746 | * 7/1987 | Senso | 360/73.03 |
| 5,225,759 | * 7/1993 | Endo et al. | 318/778 |
| 5,434,722 | * 7/1995 | Bizjak et al. | 360/73.03 |
| 5,650,886 | * 7/1997 | Codilian et al. | 360/73.03 |
| 5,953,176 | * 9/1999 | Shimazu et al. | 360/73.03 |

FOREIGN PATENT DOCUMENTS

| | | |
|---|---|---|
| 2-261095 | * 10/1990 | (JP) . |
| 2-290189 | * 11/1990 | (JP) . |
| 6-351283 | 12/1994 | (JP) . |
| 9-306089 | 11/1997 | (JP) . |
| 9-306142 | 11/1997 | (JP) . |
| 9-306143 | 11/1997 | (JP) . |
| 9-320181 | 12/1997 | (JP) . |
| 9-330556 | 12/1997 | (JP) . |

* cited by examiner

Primary Examiner—David L. Ometz
(74) Attorney, Agent, or Firm—Frishauf, Holtz, Goodman, Langer & Chick, P.C.

(57) ABSTRACT

In a motor drive for driving a motor having three-phase coils in both a high rotation speed mode in which the motor rotates at a high rotation speed and a low rotation speed mode in which the motor rotates at a low rotation speed which is extremely lower than the high rotation speed, the motor drive includes a mode selection circuit for making a connection of the three-phase coils unipolar and bipolar connections on the high and the low rotation speed modes, respectively. A frequency generation pattern detects a rotation speed of the motor. On the basis of the rotation speed detected by the frequency generation pattern, a combination of a PLL circuit and a driving transistor drives the motor at the high and the low rotation speeds in the high and the low rotation speed modes, respectively.

16 Claims, 12 Drawing Sheets

FIG. 10

REMOVABLE TYPE MAGNETIC RECORDING/REPRODUCING DEVICE

BACKGROUND OF THE INVENTION

This invention relates to a removable type magnetic recording/reproducing device such as a flexible or floppy disk drive (which may be abbreviated to "FDD") and a motor driving unit for use in the FDD.

As is well known in the art, the FDD of the type described is a device for carrying out data recording and reproducing operation to and from a magnetic disk medium of a flexible or floppy disk (which may be abbreviated to "FD") loaded therein. In recent years, the FDS have been more and more improved to have a larger storage capacity. Specifically, development has been made of the FDs having the storage capacity of 128 Mbytes (which may be called large-capacity FDs) in contrast with the FDs having storage capacity of 1 Mbyte or 2 Mbytes (which may be called small-capacity FDs). Following such development, the FDDs have also been improved to accept the large-capacity FDs for data recording and reproducing operations to and from the magnetic disk media of the large-capacity FDs. Furthermore, the large-capacity FDs have been more improved to have a larger storage capacity of 256 Mbytes, 512 Mbytes, . . . , and so on.

Throughout the present specification, FDDs capable of recording/reproducing data for magnetic disk media of the large-capacity FDs alone will be referred to high-density exclusive type FDDs. On the other hand, FDDS capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs will collectively be called high-density type FDDs.

The low-density exclusive type FDD and the high-density type FDD are different in mechanism from each other in several respects, one of which will presently be described. In either FDD, a magnetic head is supported by a carriage which is driven by a drive arrangement to move in a predetermined radial direction with respect to the magnetic disk medium of the FD loaded in the FDD. The difference resides in the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the carriage in the predetermined radial direction.

Another difference between the low-density exclusive type FDD and the high-density type FDD resides in the number of revolution of a spindle motor for rotating the magnetic disk medium of the FD loaded therein. More specifically, the low-density exclusive type FDD may rotate the magnetic disk medium of the small-capacity FD loaded therein at a low rotation speed of either 300 rpm or 360 rpm. On the other hand, the high-density type FDD can admit, as the FD to be loaded thereinto, either the large-capacity FD alone or both of large-capacity FD and the small-capacity FD. As a result, when the large-capacity FD is loaded in the high-density type FDD, the spindle motor for the high-density type FDD must rotate the magnetic disk medium of the large-capacity FD loaded therein at a high rotation speed of 3600 rpm which is equal to ten or twelve times as large as that of the small-capacity FD.

In the meanwhile, the large-capacity FD generally has an external configuration identical with that of the small-capacity FD. Specifically, both of the large-capacity and the small-capacity FDs have a flat rectangular shape of a width of 90 mm, a length of 94 mm, and a thickness of 3.3 mm in case of a 3.5-inch type. However, the large-capacity FD has a narrower track width (track pitch) than that of the small-capacity FD. As a result, it is difficult for the large-capacity FD to position a magnetic head of the high-density type FDD on a desired track in the magnetic disk medium thereof in contrast with the small-capacity FD. Accordingly, a servo signal for position detection is preliminarily written in the magnetic disk medium of the large-capacity FD.

In addition, it is necessary for the high-density/low-density compatible type FDD to identify and detect whether the FD loaded therein is the large-capacity FD or the small-capacity FD.

In the meanwhile, an FD about to manufactured (which will be called a raw FD) comprises merely a magnetic disk medium having both surfaces coated with magnetic material. In order to enable the raw FD to be utilized for an electronic device such as a personal computer or a word processor, it is necessary for the raw FD to partition the magnetic disk medium into a plurality of regions with addresses and to record and manage what information should be written in each region. Such a sequence of processing steps is called a format(ting) or an initialization.

In general, the FD comprises a magnetic disk medium on which a plurality of tracks which are arranged with concentric circles around a center of rotation thereof. The tracks may arranged with a spiral fashion around the center of rotation. Each track is divided in a circumferential direction into a predetermined number of sectors having a length equal to one another.

The formatting is classified into a physical formatting and a logical formatting. The physical formatting determines how data is arranged on the magnetic disk medium. Specifically, the physical formatting determines the total tracks, the total usable tracks, the number of sectors in each track, a medium storage capacity, a format storage capacity, and so on. On the other hand, the logical formatting determines locations where information corresponding to table of contents is written on the magnetic disk medium and assigns addresses to units each of which writes information. The logical formatting is also called a sector formatting.

More specifically, the sector formatting is performed by using a servo writer and a media formatter. The servo writer partitions first each sector into a servo field and a data field to write the above-mentioned servo signal in the servo field. In this event, the sectors on each track are assigned with sector numbers in the circumferential direction in order. Thereafter, the media formatter carries out test of the sector format and preparation of a defective map. Specifically, not that all of the tracks on the magnetic disk medium can be used by a user, an area available to the user is restricted. Such an area is referred to as a user data area. Tracks other than the user data area are used as alternate tracks for alternate sectors for replacing defective sectors in the user data area. Such an area for the alternate tracks is an alternate area. The alternate area is generally disposed in the magnetic disk medium in a radial direction on the inward side. In addition, separation of the tracks into the user data area and the alternate area is carried out by the physical formatting. The media formatter first performs test of the sector format to detect the defective sectors on the user data area. Subsequently, the media formatter carries out rearrangement of the sectors except for the defective sectors. Thereafter, the media formatter prepares a defective map. The defective map is a table for entering information indicating where the defective sectors on the user data area are arranged to which alternate sectors in the alternate area. The defective map is stored in a predetermined sector in the alternate area. If the storage capacity of a sector-formatted FD is less than a predetermined specification storage capacity due to the presence of a lot of defective sectors, the sector-formatted FD is discarded because the sector-formatted FD cannot be used.

As described above, there are various types of the large-capacity FDs so as to have the storage capacity of 128 Mbytes or 256 Mbytes. Throughout the present specification, the large-capacity FD having the storage capacity of 128 Mbytes is called a single-density large-capacity FD while the large-capacity FD having the storage capacity of 256 Mbytes is called a double-density large-capacity FD. Although each of the single-density large-capacity FD and the double-density large-capacity FD has the same line recording density, the same sector format (servo format), and the same number of disk revolution, the single-density large-capacity FD and the double-density large-capacity FD have different track densities from each other. That is, the double-density large-capacity FD has the track density twice as large as that of the single-density large-capacity FD. In addition, the high-density type FDDs capable of recording/reproducing data for magnetic disk media of the single-density large-capacity FDs will be referred to as single-density large-capacity type FDDs. On the other hand, the high-density type FDs capable of recording/reproducing data for magnetic disk media of the double-density large-capacity FDs will be referred to as double-density large-capacity type FDDs.

It is assumed that data are read from the magnetic disk medium of the double-density large-capacity FD by the magnetic head of the single-density large-capacity type FDD. In this event, an output level of the read data is half of that obtained when data on the magnetic disk medium of the single-density large-capacity FD is read by the magnetic head of the single-density large-capacity type FDD. In addition, it is assumed that data are read from the magnetic disk medium of the single-density large-capacity FD by the magnetic head of the single-density large-capacity type FDD. In this event, an output level of the read data is equivalent to that obtained when data on the magnetic disk medium of the double-density large-capacity FD are read by the magnetic head of the double-density large-capacity type FDD.

On the other hand, it is assumed that data are written in the magnetic disk medium of the double-density large-capacity FD by the magnetic head of the single-density large-capacity type FDD. In this event, a recording level of the data is lower than that obtained when data on the magnetic disk medium of the single-density large-capacity FD are written by the magnetic head of the single-density large-capacity type FDD. In addition, it is presumed that data are written in the magnetic disk medium of the single-density large-capacity FD by the magnetic head of the double-density large-capacity type FDD. In this event, a recording level of the data is equivalent to that obtained when data on the magnetic disk medium of the double-density large-capacity FD are written by the magnetic head of the double-density large-capacity type FDD.

However, once data are written in the magnetic disk medium of the single-density large-capacity FD by the magnetic head of the double-density large-capacity type FDD, the data on the magnetic disk medium of the single-density large-capacity FD only have a recording level equivalent to that of the magnetic disk medium of the signal-density large-capacity FD. As a result, when that data on the magnetic disk-medium of the single-density large-capacity FD are read by the magnetic head of the single-density large-capacity type FDD, the read data have an output level which is a half of a normal output level. Accordingly, reading of data on the magnetic disk medium of the single-density large-capacity FD by the double-density large-capacity type FDD is no problem, but writing of data on the magnetic disk medium of the single-density large-capacity FD by the double-density large-capacity type FDD is a problem. It is therefore necessary to make the double-density large-capacity type FDD have compatibility of reproduction for the single-density large-capacity FD alone.

In view of such necessity, it is necessary for the high-density type FDD to determine which type the large-capacity FD loaded therein belongs to.

In order to cope with this problem, Japanese Unexamined Patent Publications of Tokkai (JP-A) Nos. 9-306142 on Nov. 28, 1997, 9-306089 on Nov. 28, 1997, and 9-306143 on Nov. 28, 1997 disclose a large-capacity flexible disk and a high-density type disk drive used therefor. In these publications, a case accommodating the magnetic disk medium of the large-capacity FD is provided not only with a large-capacity identifier hole or notch for discriminating the large-capacity FD from a different-capacity FD but also with selectively formed type identifier holes or notches for identifying the type of the large-capacity FD. In addition, in these publications, the high-density type FDD is provided not only with a large-capacity detecting switch for detecting the presence or absence of the above-mentioned large-capacity identifier hole or notch but also with type detecting switches for detecting the presence or absence of the type identifier holes or notches.

However, the above-proposed high-density type FDD is disadvantageous in that a lot of parts are required because the high-density type FDD must be provided with the type detecting switches for detecting the type of the large-capacity FD.

In addition, Japanese Unexamined Patent Publications of Tokkai (JP-A) Nos. 9-320181 on Dec. 12, 1997 and 9-330556 on Dec. 22, 1997 disclose a control method for a spindle motor for a high-density type flexible disk drive. In these publications, the high-density type FDD comprises a switch unit for detecting whether a loaded FD is a large-capacity FD or a small-capacity FD and a control device for controlling drive of a spindle motor so as to rotate the spindle motor at a high rotation speed when the loaded FD is identified as the large-capacity FD and so as to rotate the spindle motor at a low rotation speed when the loaded FD is identified as the small-capacity FD.

As described above, the high-density/low-density compatible type FDD must rotate in the high speed mode the spindle motor at the high rotation speed which is equal to ten or twelve times as large as that in the low speed mode. In general, it is difficult to control rotation at a high precision with a desired torque using the single spindle motor in the two speed modes which have extremely different rotation speeds.

On the other hand, a technique for enabling control of the rotation speed at the high precision under a constant rotation speed mode is already known. For instance, it is possible to control the rotation speed at the high precision by using a sensorless motor driver in a case of the high rotation speed of 3,600 rpm. Furthermore, it is possible to control the rotation speed at the high precision by using an FG motor driver in a case of the low rotation speed of either 300 rpm or 360 rpm. A three-phase brushless d.c. motor is used as a motor operable at the constant rotation speed mode. In addition, there are two methods of connecting windings in the three-phase brushless d.c. motor, namely, a unipolar connection and a bipolar connection. The unipolar connection is a connection where a common connection terminal of three-phase coils is connected to either a power supply terminal or a ground terminal to allow current to flow through the coil of each phase. The bipolar connection is a connection where the common connection terminal of the three-phase coles is opened to allow current to flow through two coils at a time. The bipolar connection is used in control of the number of revolution under the above-mentioned constant rotation speed mode.

A motor drive is proposed in Japanese Unexamined Patent Publication of Tokkai No. Hei 6-351,283 or JP-A 6-351,283 on Dec. 22, 1994 which is hereby incorporated herein by reference. The motor drive selectively allows switching of the unipolar connection and the bipolar connection in order to allow a single motor to switch a motor characteristics at two rotation speed modes which are operable at a low speed rotation state and a high speed rotation state. The motor drive is used, for example, in a portable magnetic tape recorder to satisfactorily carry out by using the single motor both of a low-speed (a constant-speed) tape travelling mode such as reproduction (playback), recording of a tape, or the like and a high-speed tape travelling mode such as rapid traversing, rewinding of the tape, or the like. In the low rotation speed mode (or in the low-speed tape travelling mode such as the above-mentioned reproduction, recording, or the like), the motor drive selects the bipolar connection to drive the motor with a full wave and it results in a power-saving effect. On the other hand, in the high rotation speed mode (or in the high-speed tape travelling mode such as the above-mentioned rapid traversing, rewinding, or the like), the motor drive selects the unipolar connection to drive the motor with a half wave and this results decreasing the number of revolutions in the motor.

However, it is difficult in the JP-A 6-351,283 to control the number of revolutions (the rotation speed) at the high precision although it is possible to obtain a necessary torque in each of the low rotation speed mode and the high rotation speed mode. This is because it is not necessary for the drive motor to control the number of revolutions at the high precision from the first particularly in the high rotation speed mode which is used in the rapid traversing or the rewinding of the tape.

For example, it is necessary for the high-density/low-density compatible type FDD to have the torque equal to or more than 14 g-cm in the high rotation speed mode and to have the torque equal to or more than 60 g-cm in the low rotation speed mode. In addition, it is necessary for the high-density/low-density compatible type FDD to restrain fluctuations in the number of revolutions within 0.2%.

SUMMARY OF THE INVENTION

It is therefore an object of this invention to provide a motor drive which is capable of controlling the number of revolutions at a high precision using a single motor in two rotation speed modes having rotation speeds which are extremely different from each other.

It is another object of this invention to provide a motor drive of the type described, which is capable of controlling the number of revolutions with a necessary torque in each of the two rotation speed modes using the single motor.

It is a subordinate object of this invention to provide a high-density/low-density compatible type flexible disk drive provides with the above-mentioned motor drive.

It is a different object of this invention to provide a removable type magnetic recording/reproducing device which is capable of detecting a type of a magnetic recording medium loaded therein without increase in parts thereof.

According to a first aspect of the present invention, a motor drive drives a motor having three-phase coils in both a high rotation speed mode in which the motor rotates at a high rotation speed and a low rotation speed mode in which the motor rotates at a low rotation speed which is much lower than the high rotation speed. The motor drive comprises mode selection means for making a connection of the three-phase coils unipolar and bipolar connections in the high and the low rotation speed modes, respectively. Rotation speed detecting means detects a rotation speed of the motor. Connected to the mode selection means and the rotation speed detecting means, driving means drives, on the basis of the rotation speed detected by the rotation speed detecting means, the motor at the high and the low rotation speeds in the high and the low rotation speed modes, respectively.

According to a second aspect of the present invention, a high-density/low-density compatible type flexible disk drive enables to carry out data recording and reproducing operation to and from disk-shaped magnetic recording media of both a large-capacity and a small-capacity flexible disks. The magnetic recording medium of the large-capacity flexible disk requires to rotate at a high rotation speed on recording and reproducing. The magnetic recording medium of the small-capacity flexible disk requires to rotate at a low rotation speed which is much lower than the high rotation speed on recording and reproducing. The high-density/low-density compatible type flexible disk drive comprises a motor having three-phase coils for driving the magnetic disk media of both the large-capacity and the small-capacity flexible disks and a motor drive for driving the motor in both a high rotation speed mode in which the motor rotates at the high rotation speed and a low rotation speed mode in which the motor rotates at the low rotation speed. The motor drive comprises mode selection means for making a connection of the three-phase coils unipolar and bipolar connections in the high and the low rotation speed modes, respectively. Rotation speed detecting means detects a rotation speed of the motor. Connected to the mode selection means and the rotation speed detecting means, driving means drives, on the basis of the rotation speed detected by the rotation speed detecting means, the motor at the high and the low rotation speed in the high and the low rotation speed modes, respectively.

According to a third aspect of the present invention, a removable type magnetic recording/reproducing device enables to removably access a large-capacity flexible disk comprising a disk-shaped magnetic recording medium and a shell for receiving the disk-shaped magnetic recording medium. The shell has large-capacity identifier means for identifying the large-capacity flexible disk in distinction from a different-capacity flexible disk. The disk-shaped magnetic recording medium comprises a plurality of tracks thereon which are arranged with concentric circles around a center of rotation thereof. Each track is divided in a circumferential direction into a predetermined number of sectors having a length equal to one another. The plurality of tracks are separated in a radial direction into a user data area which is available to a user and an alternate area other than the user data area. The alternate area has a specific sector for storing capacity information indicative of a storage capacity of the disk-shaped magnetic recording medium. The removable type magnetic recording/reproducing device comprises large-capacity detecting means disposed at a position corresponding to the large-capacity identifier means and means for recognizing the storage capacity of the disk-shaped magnetic recording medium by reading the capacity information out of the specific sector on the disk-shaped magnetic recording medium of the large-capacity flexible disk.

BRIEF DESCRIPTION OF THE DRAWING

FIG. 10 is a block diagram of a signal system for use in the high-density type FDD illustrated in FIG. 7.

DESCRIPTION OF THE PREFERRED EMBODIMENTS

Figure 1:
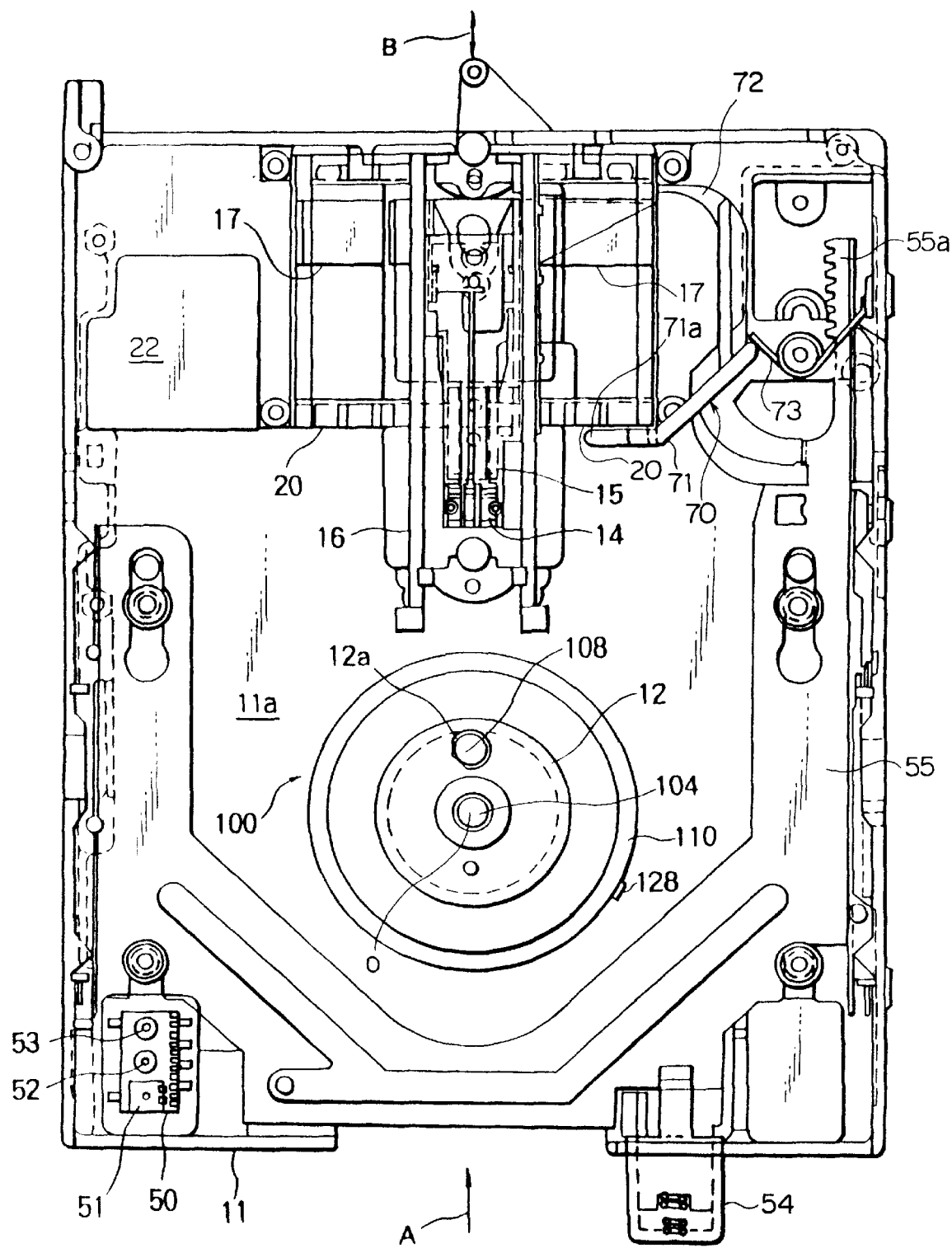
FIG. 1 is a plan view of a high-density type FDD to which this invention is applicable.

Referring to FIG. 1, description will proceed to a high-density type flexible disk drive (FDD) to which this invention is applicable. The illustrated high-density type FDD is a high-density/low-density compatible type FDD for enabling to carry out recording/reproducing of data for magnetic disk media of both a large-capacity and a small-capacity flexible disks (FDs) which will later be described.

The FD is loaded into the high-density type FDD from an insertion direction indicated by an arrow A in FIG. 1. FIG. 1 shows a state where the FD is loaded into the high-density type FDD. The FD has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The loaded FD is held on the holder disk table 12 so that the table center axis O coincides with the disk center axis. The disk holder table 12 is rotatably driven by a spindle motor (SPM) 100 which will later be described. The spindle motor 100 is mounted on the main frame 11 with the spindle motor 100 put into a state embedded in a concave portion (which will later be described) of the main frame 11, thereby the magnetic disk medium in the FD rotates at a desired rotation speed in the manner which will become clear. In addition, the main frame 11 has a back surface (not shown) on which a printed-circuit board 22 is attached. A number of electronic parts (not shown) are mounted on the printed-circuit board 22.

The high-density type FDD comprises a pair of magnetic heads (not shown) for reading/writing data from/to the magnetic disk medium in the FD. The magnetic heads are supported via gimbals 14 with the carriage 15. A combination of the magnetic heads, the gimbals 14, the carriage 15, a pair of voice coils 17 (which will later be described), a scale (not shown), a spring holder, and a spring is called a carriage assembly. The carriage 15 is disposed over the main surface 11a of the main frame 11 with a space left therebetween. The carriage 15 supports the magnetic heads movably in a predetermined radial direction (i.e. a direction indicated by an arrow B in FIG. 1) with respect to the FD.

The carriage 15 is supported and guided at both lower sides thereof by a pair of guide bars 16 which extend to directions in parallel with the predetermined radial direction B.

The carriage 15 is driven in the predetermined radial direction B by a voice coil motor which will later be described. More specifically, the voice coil motor comprises the pair of voice coils 17 and a pair of magnetic circuits 20. The voice coils 17 are disposed on the carriage 15 at a rear side and are wound around driving axes in parallel with the predetermined radial direction B. The magnetic circuits 20 generate magnetic fields which intersect currents flowing in the voice coils 17. With this structure, by causing the currents to flow in the voice coils 17 in directions where the magnetic fields generated by the magnetic circuits 20 intersect, driving force occurs along the predetermined radial direction B extending to the driving axes on the basis of interaction between the currents and the magnetic fields. The driving force causes the voice coil motor to move the carriage 15 in the predetermined radial direction B.

Figure 2A:
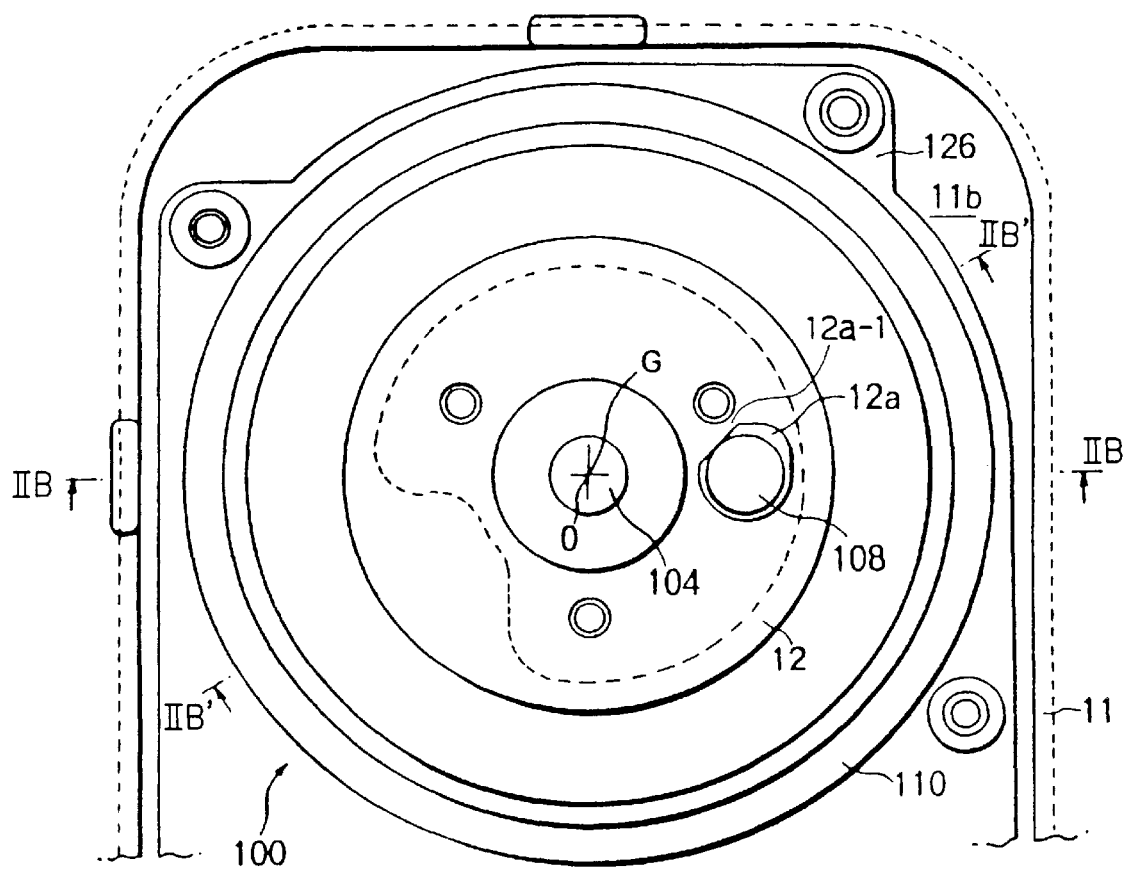
FIGS. 2A and 2B collectively show a spindle motor for use in the high-density type FDD illustrated in FIG. 1.
Figure 2B:
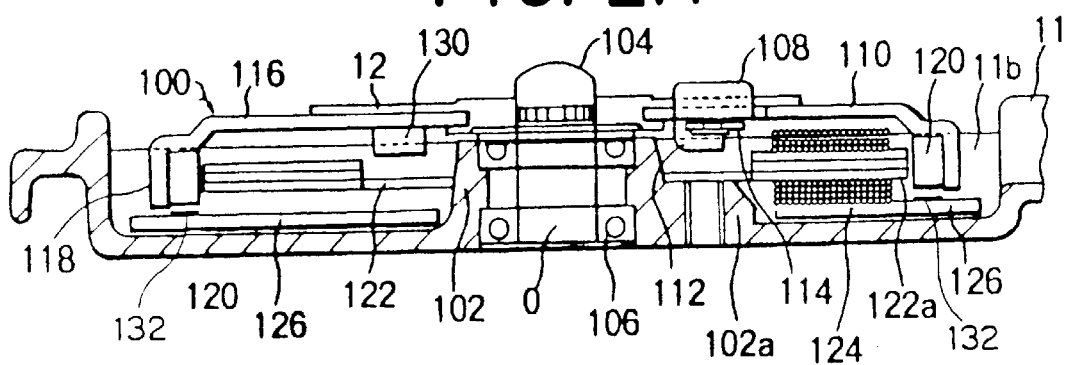

Referring to FIGS. 2A and 2B, description will proceed to the spindle motor 100 for use in the high-density type FDD illustrated in FIG. 1. The spindle motor 100 comprises a rotor and a stator both of which will later become clear. FIG. 2A is a plan view of the spindle motor 100. FIG. 2B is a cross-sectional view taken on line IIB—IIB with respect to the rotor and on line IIB'—IIB' with respect to the stator in FIG. 2A.

The illustrated spindle motor 100 is a type mounted on the main surface 11a of the main frame 11 in place of the back surface of the main frame 11. In particular, the spindle motor 100 is mounted on the main surface 11a with the spindle motor 100 embedded in the concave portion 11b of the main frame 11.

The main frame 11 comprises a bearing metal 102 of substantially cylindrical shape in the concave portion 11b. The bearing metal 102 stands in the concave portion 11b substantially perpendicular to the main surface 11a of the main frame 11. With the bearing metal 102, a spindle shaft 104 is rotatably supported with respect to the main frame 11 via a ball bearing 106 substantially perpendicular to the main surface 11a of the main frame 11. The spindle shaft 104 serves as the axis O of the rotation for the magnetic disk medium of the FD loaded in the high-density type FDD. The disk holder table 12 is fixed to the spindle shaft 104 at an upper portion thereof. The disk holder table 12 has a main surface which extends to a direction perpendicular to a longitudinal direction (a direction of the axis O of the rotation) of the spindle shaft 104.

That is, the disk holder table 12 is rotatably supported on the main surface 11a of the main frame 11 and holds the FD loaded in the high-density type FDD so that the table center axis O (the axis of the rotation) coincides with the disk center axis of the FD.

Figure 3A:
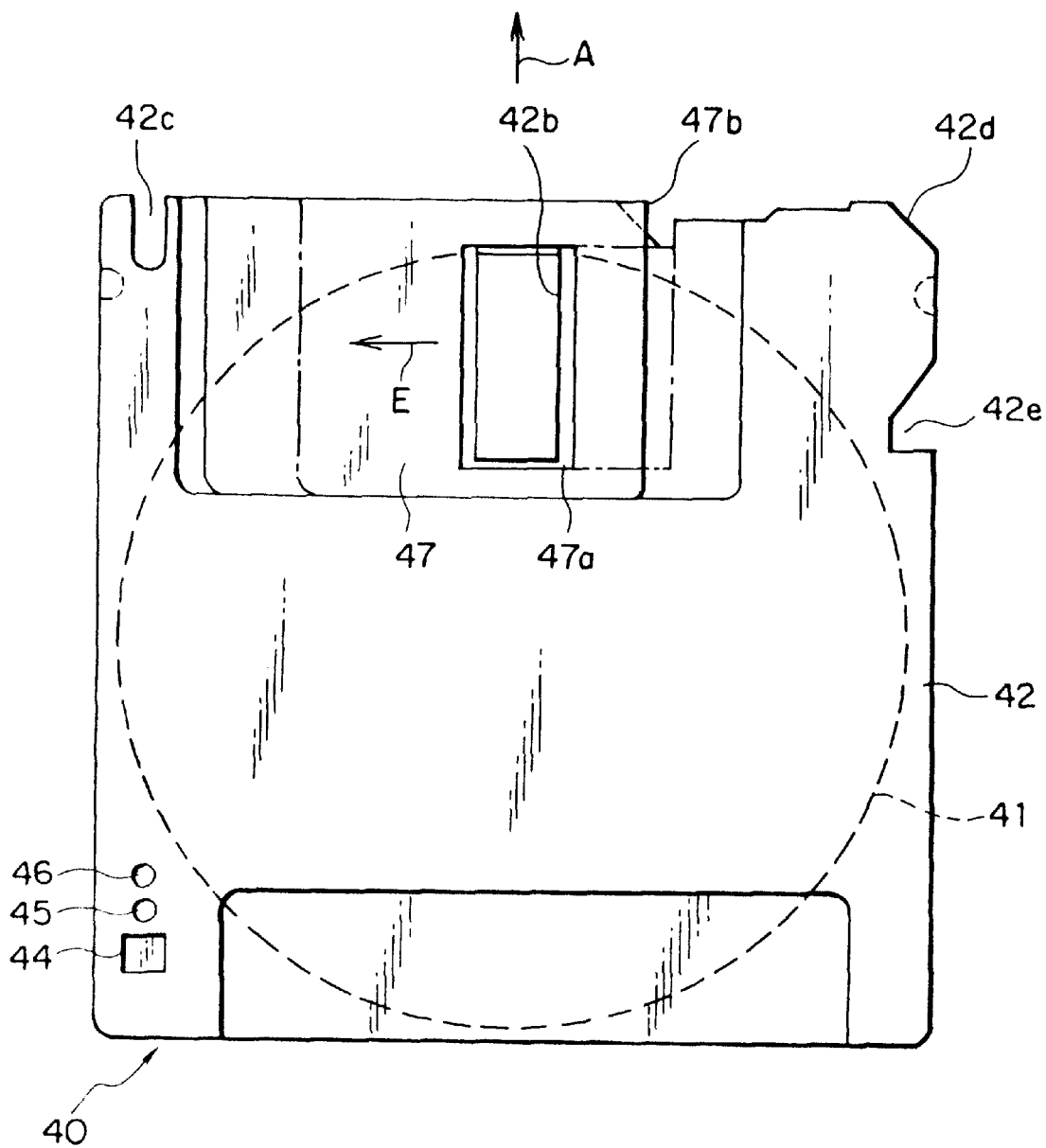
FIGS. 3A and 3B collectively show a large-capacity FD loaded in the high-density type FDD illustrated in FIG. 1.
Figure 3B:
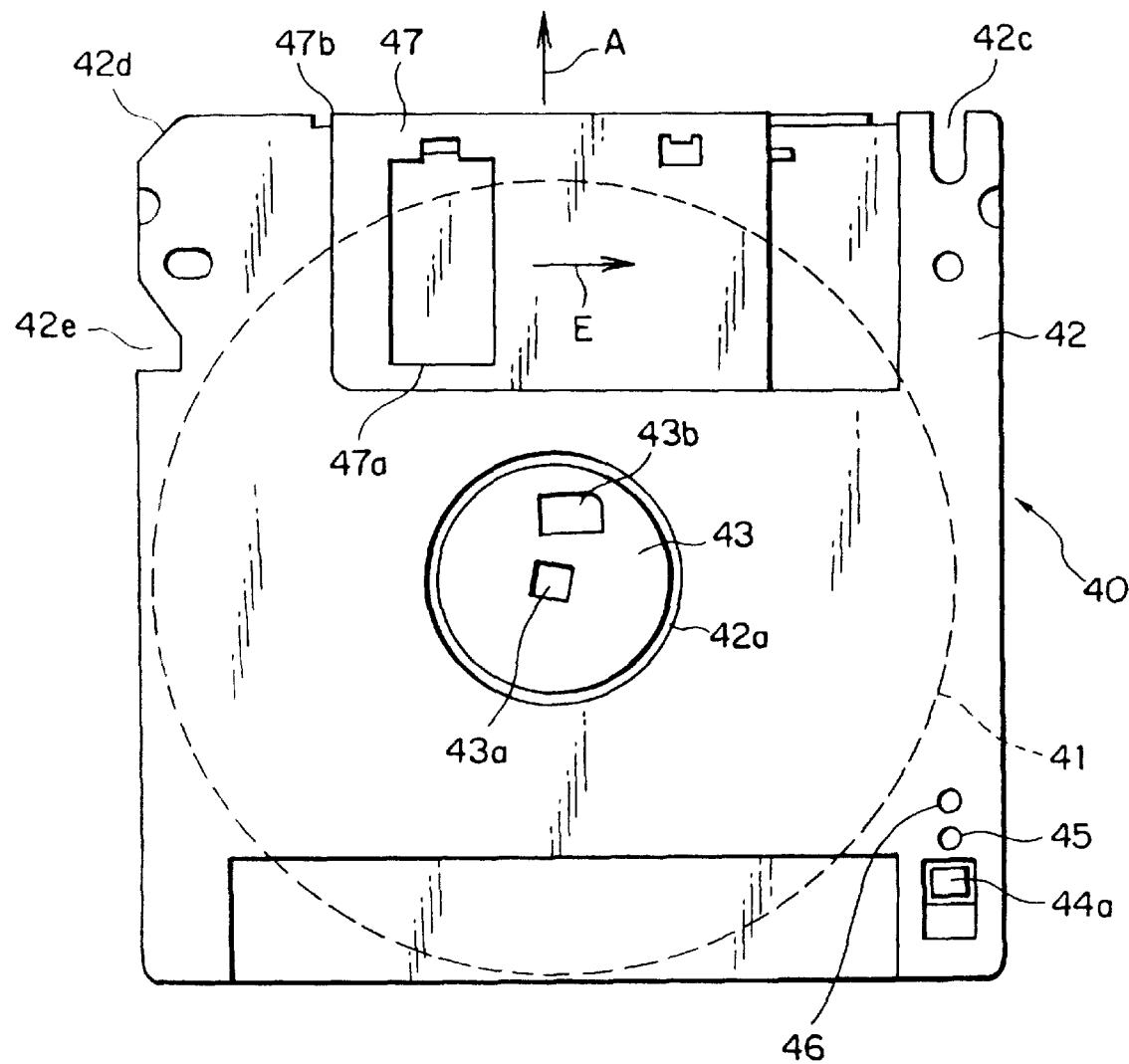

Turning to FIGS. 3A and 3B, description will proceed to the large-capacity FD depicted at 40. FIG. 2A is a plan view of the large-capacity FD as seen from an upper surface side while FIG. 3B is a bottom view of the large-capacity FD as seen from a lower surface side. The illustrated large-capacity FD 40 is a 3.5-inch type and comprises a disk-shaped magnetic recording medium 41 serving as a disk-shaped magnetic recording medium, and a shell or a case 42 for receiving the magnetic recording medium 41. The shell 42 consists of an upper shell or case (FIG. 3A) having the upper surface and a lower shell or case (FIG. 3B) having the lower surface.

As shown in FIG. 3B, in the lower surface of the shell 42, a circular aperture 42a is formed at a center portion of the large-capacity FD 40. In the circular aperture 42a is freely received a disk hub (a disk-shaped metal) 43 for holding the magnetic recording medium 41. The disk hub 43 has a disk center hole 43a at a center portion thereof and a chucking hole (a disk driving oval hole) 43b at a position eccentric with the center portion thereof. The disk center hole 43a has substantially a rectangular shape and receives the spindle shaft 104 (FIG. 2B) therein in the manner which will later be described. The chucking hole 43b freely receives a chucking pin or a drive roller 108 (FIG. 1) therein in the manner which will also later be described.

Turning back to FIGS. 2A and 2B, the disk holder table 12 has a diameter which is longer than that of the disk hub 43 and which is shorter than that of the circular aperture 42a of the shell 42.

The disk holder table 12 has a table driving oval hole 12a at a position corresponding to the chucking hole (the disk driving oval hole) 43b (FIG. 3B). Through the table driving oval hole 12a, the chucking pin (the drive roller) 108 is freely received in the chucking hole 43b of the FD 40 in the manner which will later become clear. The table driving oval hole 12a has an inclined portion 12a-1 as shown in FIG. 2A. The disk holder table 12 is mounted on a magnetic case 110 at a bottom surface thereof. The magnetic case 110 has a flexible arm 112 having an end which is provided with a holding portion 114. The chucking pin 108 is rotatably and movably mounted on the flexible arm 112 at the end thereof via the holding portion 114 with the chucking pin 108 urged upwardly. Accordingly, the chucking pin 108 moves downwardly or sinks in the disk holder table 12 if any load is applied to the chucking pin 108 downwards.

In the example being illustrate, the magnetic case 110 is made of iron and is formed in a shape of a tray by presswork. More specifically, the magnetic case 110 comprises a disk portion 116 and a circumferential wall 118. The disk portion 116 extends in a direction parallel with the disk holder table 12. The circumferential wall 118 is bent downwardly at an circumferential edge of the disk portion 116. The circumferential wall 118 has an inner surface on which a ring-shaped main magnet 120 is fixed.

At any rate, the spindle shaft 104, the disk holder table 12, the chucking pin 108, the magnetic case 110, the arm 112, the holding portion 114, and the ring-shaped main magnet 120 compose the rotor of the spindle motor 100.

The bearing metal 102 includes a flange portion 102a. On the flange portion 102, a core 122 is fixed by screws (not shown) and is mounted. The core 122 comprises a plurality of magnetic pole forming sections 112a which extend with equal intervals in a radial manner. Around each magnetic pole forming section 112a, one of three-phase coils 124 is wound. That is, a combination of the magnetic pole forming section 112a and one of the three-phase coils 124 serves as an electromagnet or a magnetic pole. The electromagnet is opposed to the above-mentioned main magnet 120 with a predetermined space (gap) left therebetween. At any rate, the core 122 and the three-phase coils 124 compose the stator of the spindle motor 100.

The circumferential wall 118 of the magnetic case 108 has an outer surface at a predetermined position of which an index detection magnet 128 (FIG. 1) of rectangular parallelepiped shape is fixed. In addition, in the concave portion 11b of the main frame 11, a subsidiary printed-circuit board 126 is fixed by screws (not shown) and is received. Mounted on the subsidiary printed-circuit board 126, a magnetic sensor (not shown) detects a magnetic field generated by the index detection magnet 128.

Furthermore, the illustrated spindle motor 100 is provided with a balancer 130 acting as a balance arrangement. The balancer 130 is mounted on the magnetic case 110 at the lower surface thereof opposite to the chucking pin 108 with the spindle shaft 104 sandwiched therebetween. As a result, it is possible to balance the rotor of the spindle motor 100 on rotating (in particular, on rotating at the high rotation speed) so as to make the center G of gravity in the rotor coincide with the axis O of the rotation.

Referring to FIGS. 3A and 3B again, a write protection hole 44 is bored in the shell 42 of the large-capacity FD 40 at a corner portion in rear and right-hand side with respect to an insertion direction depicted at an arrow A of FIG. 3B as view from the lower surface of the large-capacity FD 40. In other words, the write protection hole 44 is bored in the shell 42 of the large-capacity FD 40 at the corner portion in rear and left-hand side in the insertion direction A of FIG. 3A as viewed from the upper surface of the large-capacity FD 40. FIG. 3B shows a state where the write protection hole 44 is shut by a write protection tab 44a. The write protection tab 44a enables to slide along a direction in parallel with the insertion direction A. It is possible to carry out opening and closing of the write protection hole 44 by operating the write protection tab 44a manually. When the write protection hole 44 is closed by the write protection tab 44a, the large-capacity FD 40 is put into a write enable state. When the write protection hole 44 is opened by the write protection tab 44a, the large-capacity FD is put into a write disable state.

The illustrated large-capacity FD 40 shows a case where there are two types of storage capacity of, for example, 128 Mbytes and 256 Mbytes. In the vicinity of the write protection hole 44, a large-capacity identifier hole 45 is bore in the shell 42 of the large-capacity FD 40. The large-capacity identifier hole 45 is for identifying the large-capacity FD 40 in distinction from the small-capacity FD. In addition, a type identifier hole 46 is selectively bored in the shell 42 of the large-capacity FD 40 near the write protection hole 44 together with the large-capacity identifier hole 45. The type identifier hole 46 is for identifying a type of the large-capacity FD 40. It is possible to identify the type of the large-capacity FD 40 according to the presence or absence of the type identifier hole 46. It is assumed that the large-capacity FD 40 having the storage capacity of 128 Mbytes is referred to as a first type of the large-capacity FD while the large-capacity FD 40 having the storage capacity of 256 Mbytes is referred to as a second type of the large-capacity FD. In the example being illustrated, the type identifier hole 46 is not bore in the shell 42 of the first type of the large-capacity FD while the type identifier hole 46 is bored in the shell 42 of the second type of the large-capacity FD.

Although illustration is omitted, as is well known in the art, the large-capacity identifier hole 45 and the type identifier hole 46 are not bored in a shell or case of the small-capacity FD.

Turning back to FIG. 1 in addition to FIGS. 3A and 3B, on the printed-circuit board 22 mounted on the back surface of the main frame 11, the high-density type FDD further comprises a switch unit 50 at a corner position in rear and left-hand side with respect to the insertion direction A. The switch unit 50 comprises a plurality of push switches which will presently be described. The switch unit 50 is for detecting the presence or absence of the write protection hole 44, the large-capacity identifier hole 45, and the type identifier hole 46.

More specifically, the switch unit 50 comprises, as the push switches, a write control switch 51, a large-capacity detecting switch 52, and the type detecting switch 53. The write control switch 51 is a push switch for detecting the opening or closing state of the write protection hole 44. The control switch 51 is disposed at a position corresponding to the write protection hole 44 when the large-capacity FD 40 is loaded in the high-density type FDD. The large-capacity detecting switch 52 is a push switch for detecting whether the loaded FD is the large-capacity FD or the small-capacity FD. The large-capacity detecting switch 52 is disposed at a position corresponding to the large-capacity identifier hole 45 when the large-capacity FD 40 is loaded in the high-density type FDD. The type detecting switch 53 is a push switch for detecting the presence or absence of the type identifier hole 45. The type detecting switch 53 is disposed at a position corresponding to the type identifier hole 46 when the large-capacity FD 40 is loaded in the high-density type FDD.

Figure 4:
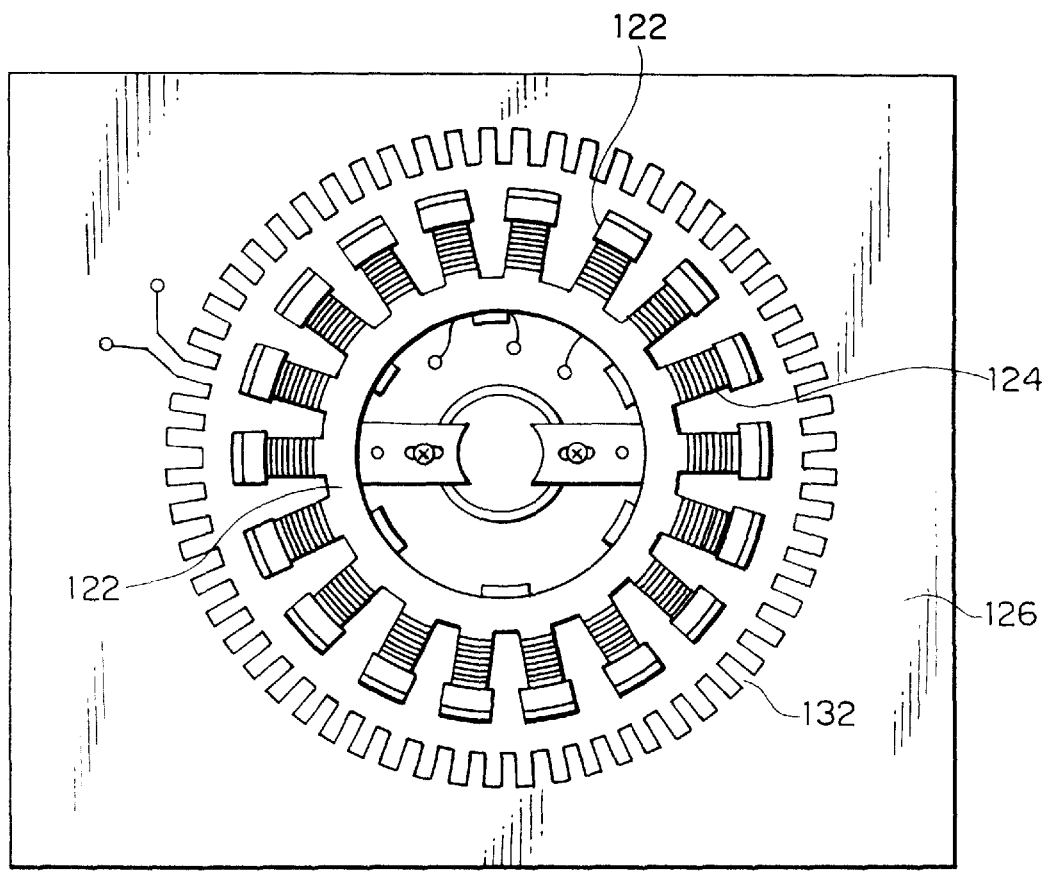
FIG. 4 is a plan view showing an example of a frequency generation (FG) pattern formed on a subsidiary printed-circuit board.

Turning to FIG. 4 in addition to FIG. 2B, a sawtooth conductor pattern 132 is formed on the subsidiary printed-circuit board 126 around the stator of the spindle motor 100 all over circumference. The sawtooth conductor pattern 132 is for detecting the rotation speed of the spindle motor and is therefore called a frequency generation pattern (which is abbreviated an FG pattern hereinafter). The FG pattern 132 generates an FG signal having pulses which in number to sixty during one rotation of the spindle motor 100. As is well known in the art, 300 rpm is equivalent to 5 Hz/rev while 3,600 rpm is equivalent to 60 Hz/rev. As a result, the FG pattern 132 generates the FG signal having a frequency of 300 Hz if the magnetic disk medium of the small-capacity FD rotates at its prescribed rotation speed of 300 rpm by the spindle motor 60. Likewise, the FG pattern generates the FG signal having a frequency of 3,600 Hz if the magnetic disk medium of the large-capacity FD 40 rotates at its prescribed rotation speed of 3,600 rpm by the spindle motor 100.

On the other hand, as described above, the rotor of the spindle motor 100 comprises the magnetic case 110 and the ring-shaped main magnet 120 attached to the inner surface thereof. The ring-shaped main magnet 120 is position on the FG pattern 132 with its inner peripheral end surface confronting pole horns of the magnetic pole forming sections 112a of the core 122. The ring-shaped main magnet 120 has a plurality of equiangularly split regions in a circumferential direction and is subjected to split magnetization such that N poles and S poles appear in these regions on its internal side wall and that the polarity is alternately reversed.

Although the FG pattern 132 is formed on the subsidiary printed-circuit board 126 all over circumference in the example being illustrated, the FG pattern 132 may be formed on the subsidiary printed-circuit board 126 in an area defined by a predetermined angular range, for example, between 180° and 270°.

Turning back to FIGS. 3A and 3B, the large-capacity FD 40 further comprises a shutter 47 at a front side thereof. The shutter 47 is slidable in a direction depicted at E in FIGS. 3A and 3B. The shutter 47 is provided with a window 47a. The shutter 47 is urged by a spring (not shown) in a direction reverse to the direction E. When the shutter 47 makes sliding movement in the direction E, the window 47a of the shutter 47 is faced to an opening 42b formed in the shell 42. At this time. it is possible to access the magnetic recording medium 41 by upper and lower magnetic heads (not shown) through the opening 42b.

Turning back to FIG. 1, the high-density type FDD includes a shutter drive mechanism for opening and closing the shutter 47 of the large-capacity FD 40, an ejector mechanism for ejecting the large-capacity FD 40, and a carriage locking mechanism for locking a direct-acting type carriage mechanism (which will later be described) after ejection of the large-capacity FD 40.

The high-density type FDD further comprises a lever unit 70. the lever unit 70 comprises an eject lever 71 and a lock lever 72. The eject lever 71 serves both as a component of the shutter drive mechanism for opening and closing the shutter 47 and as a component of the ejector mechanism for ejecting the large-capacity FD 40 from the high-density type FDD. The lock lever 72 is located in the vicinity of the direct-acting type carriage mechanism and serves to lock the direct-acting type carriage mechanism upon ejection of the large-capacity FD 40.

The ejector mechanism comprises an eject button 54 projecting into an outer surface of a front bezel (not shown) of the high-density type FDD, an eject plate 55 for positioning the large-capacity FD 40 loaded through an insertion slot (not shown) of the front bezel so that one surface of the large-capacity FD 40 is faced to the eject plate 55, and a pair of eject springs (not shown) having one end engaged with eject plate 55 and the other end engaged with a disk holder unit (not shown). The eject plate 55 has a rack 55a at its top end in a depth direction. The rack 55a is engaged with a pinion (not shown) rotatably supported on the main surface 11a of the main frame 11. The lever unit 70 is urged by a spring mechanism 73 in a counterclockwise direction.

It is assumed that the large-capacity FD 40 is loaded into the disk holder unit of the high-density type FDD. Specifically, when the large-capacity FD 40 is inserted in the direction depicted at the arrow A in FIG. 1, a top end 71a of the eject lever 71 is engaged an upper end 47b of a right side edge of the shutter 47. With the movement of the large-capacity FD 40, the lever unit 70 is rotated in a clockwise direction. Consequently, the shutter 47 is forced by the top end 71a of the eject lever 71 to make sliding movement in the direction depicted by the arrow C.

When the large-capacity FD 40 is completely received in the disk holder unit of the high-density type FDD, the disk holder unit comes down and then the large-capacity FD 40 is locked by a disk lock mechanism (not shown) to be stably held in the disk holder unit. In this state, engagement between side arms (not shown) of the carriage assembly and the disk holder unit is released and the window 47a of the shutter 47 is located directly above the opening 42b of the shell 42. Accordingly, the upper magnetic head is in contact with the magnetic recording medium 41 of the large-capacity FD 40 through the window 47a of the shutter 47 and the opening 42a of the shell 42. The shutter 47 is urged by a spring member (not shown) to be located at a position indicated by a dash-and-dot line in FIG. 3A.

The high-density type FDD comprises a pair of magnetic heads for reading/writing data from/to the magnetic recording medium 41 in the large-capacity FD 40. The magnetic heads are supported via gimbals 14 with a carriage 15. A combination of the gimbals 14 and the carriage 15 is called the carriage assembly. The carriage 15 is disposed over the main surface 11a of the main frame 11 with a space left therebetween. The carriage 15 supports the magnetic heads movably along a predetermined radial direction (i.e. a direction indicated by an arrow B in FIG. 1) with respect to the large-capacity FD 40.

The carriage 15 is supported and guided at both lower sides thereof by a pair of guide bars 16 which extend to directions in parallel with the predetermined radial direction B. The carriage assembly is driven in the predetermined radial direction B by a voice coil motor (VCM) which will later be described. As shown in FIG. 1, the carriage assembly is provided with a pair of voice coils 17 at opposite rear sides thereof. The voice coils 17 act as components of the voice coil motor.

Now, description will be made as regards the voice coil motor (VCM). The voice coil motor comprises the pair of voice coils 17 located at opposite rear side of the carriage assembly and wound around drive axes parallel to the predetermined radial direction B, and a pair of magnetic circuits 20 for producing magnetic fields intersecting electric currents flowing through the voice coils 17. In the voice coil motor of the above-mentioned structure, when the electric current is made to flow through each of the voice coils 17 in a direction intersecting the magnetic field produced by the magnetic circuit 20, a drive force is generated in an extending direction of each drive axis as a result of an interaction between the electric current and the magnetic field. The drive force causes the voice coil motor to make the carriage assembly move in the predetermined radial direction B.

Turning back to FIGS. 3A and 3B again. the shell 42 has a first notch 42c formed on a forward side thereof in the insertion direction A. The shell 42 further has a second notch 42e formed on a lateral side provided with a chamfered portion 42d for preventing reverse insertion (wrong insertion in a vertical direction or in the insertion direction A). The second notch 42e has a particular shape and is formed at a particular position so that the second notch 42e is engaged by a reverse insertion preventing lever of the small-density exclusive type FDD. In other words, the shell of the small-capacity FD does not have the first and the second notches 42c and 42e.

In addition, the magnetic recording medium 41 of the large-capacity FD 40 has a medium rotation speed of 3,600 rpm. In this connection, the magnetic recording medium of the small-capacity FD has a medium rotation speed of 300 rpm. That is, the medium rotation speed of the large-capacity FD 40 it twelve times as large as that of the small-capacity FD.

Figure 5:
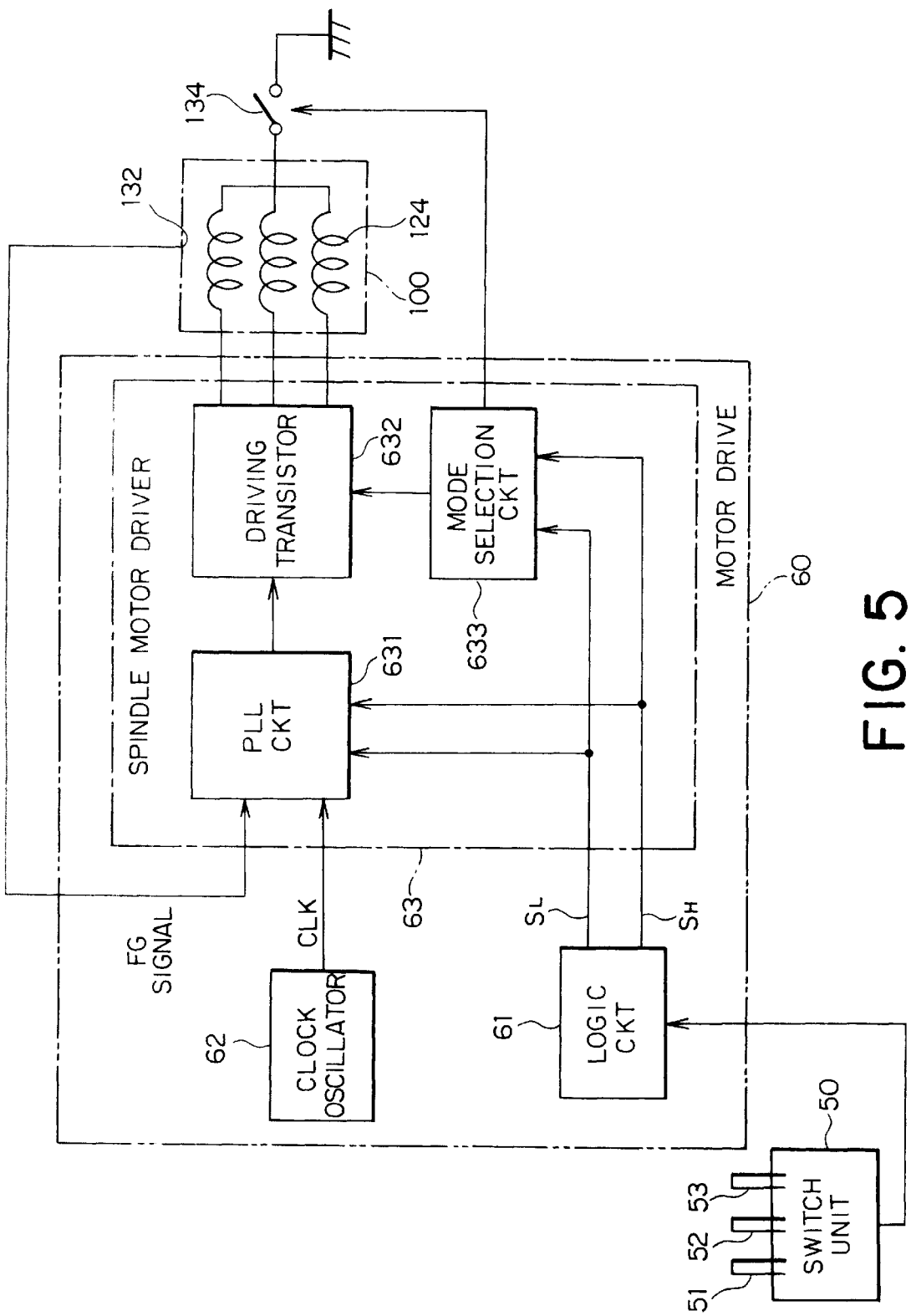
FIG. 5 is a block diagram of a motor drive according to an embodiment of this invention with the spindle motor and a switch unit.

Turning to FIG. 5, description will proceed to a motor drive 60 according to an embodiment of this invention. FIG. 5 shows the motor drive 60 as well as the switch unit 50 illustrated in FIG. 1. The motor drive 60 is for controlling drive of the spindle motor 100. The motor drive 60 comprises a logic circuit 61, a clock oscillator 62, and a spindle motor driver 63. Responsive to a detected signal from the switch unit 50, the logic circuit 61 selectively produces one of a low speed selection signal $S_L$ and a high speed selection signal $S_H$ in the manner which will later become clear. The clock oscillator 62 oscillates a clock signal CLK having a clock frequency of 1 MHz. Responsive either the low speed selection signal $S_L$ or the high speed selection signal $S_H$, the spindle motor driver 63 drives the spindle motor 100 in synchronism with the clock signal CLK on the basis of the FG signal.

The low speed selection signal $S_L$ is a signal indicative of making the magnetic recording medium of the loaded FD rotate at the low rotation speed of 300 rpm. The high speed selection signal $S_H$ is a signal indicative of making the magnetic recording medium of the loaded FD rotate at the high rotation speed of 3,600 rpm.

The spindle motor driver 63 comprises a phase-locked loop (PLL) circuit 631, a driving transistor 632, and a mode selection circuit 633. The PLL circuit 631 includes a frequency divider (not shown) for frequency dividing the clock signal CLK. Responsive to the low speed selection signal $S_L$, the frequency divider frequency divides the clock signal CLK having the clock frequency of 1 MHz into a divided signal signal having a divided frequency of 300 Hz. Likewise, responsive to the high speed selection signal $S_H$, the frequency divider frequency divides the clock signal having the clock frequency of 1 MHz into a divided signal having a divided frequency of 3,600 Hz. The PLL circuit 631 detects a phase difference between the FG signal and the divided signal to produce a control signal indicative of the phase difference.

The three-phase coils 124 have a common connection terminal 124a which is connected to a ground terminal via a speed switching device 134. Responsive to the low speed selection signal $S_L$, the mode selection circuit 633 turns the speed switching device 134 off to make the three-phase coils 124 the bipolar connection and to supply the driving transistor 632 with a mode selection signal indicative of a low speed rotation mode. On the other hand, responsive to the high speed selection signal $S_H$, the mode selection circuit 633 turns the speed switching device 134 on to make the three-phase coils 124 the unipolar connection and to supply the driving transistor 632 with the mode selection signal indicative of a low speed rotation mode. On the basis of the control signal and the mode selection signal, the driving transistor 632 drives the spindle motor 100. That is, the spindle motor driver 63 drives the spindle motor 100 so that the frequency of the FG signal coincides with the divided frequency of the divided signal.

Although the speed switching device 134 is connected to the ground terminal in the example being illustrated, the speed switching device 134 may be connected to a power supply terminal (not shown).

Figure 6:
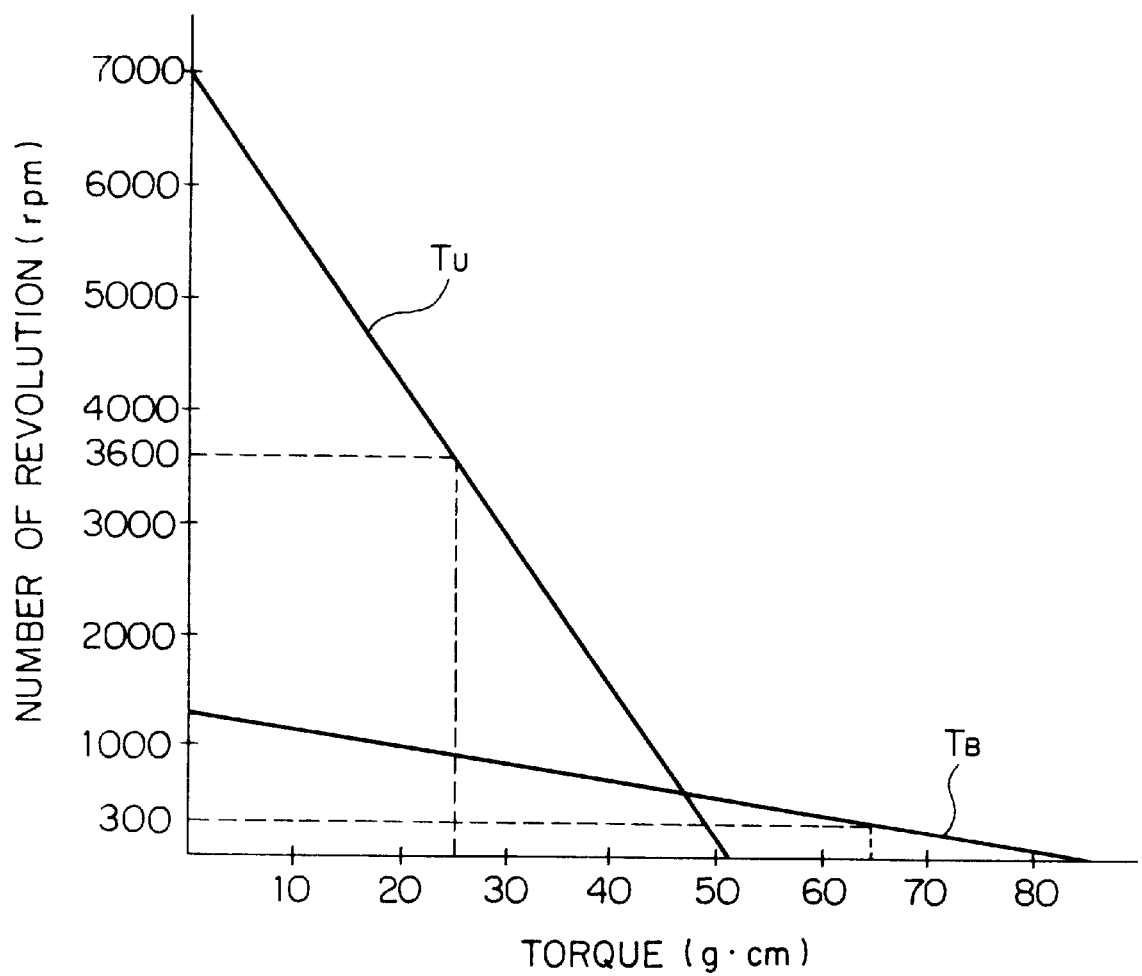
FIG. 6 shows basis torque characteristic curves of the spindle motor on unipolar and bipolar connections.

FIG. 6 shows basic torque characteristic curves of the spindle motor 100 in a case of making the connection of the three-phase coils 124 of the spindle motor 100 the unipolar connection and the bipolar connection. In FIG. 6, the abscissa and the ordinate represent the torque (g-cm) and the number of revolutions (rpm). In FIG. 6, a symbol of $T_U$ represents a basic torque characteristic curve of the spindle motor 100 in a case of the unipolar connection while another symbol of $T_B$ represents another basic torque characteristic curve of the spindle motor 100 in another case of the bipolar connection. As mentioned in the preamble of the instant specification, in the high-density/low-density compatible type FDD, it is necessary to have the torque equal to or more than 14 g-cm in the high rotation speed mode indicative of the number of revolutions of 3,600 rpm and to have the torque equal to or more than 60 g-cm in the low rotation speed mode indicative of the number of revolutions of 300 rpm. As illustrated in FIG. 6, the torque is equal to about 25 g-cm at the number of revolutions of 3,600 rpm in the case of the unipolar connection while the torque is equal to about 65 g-cm at the number of revolutions of 300 rpm in the case of the bipolar connection. As a result, it is understood that it is possible to obtain a necessary torque by making the connection of the three-phase coils 124 of the spindle motor 100 the unipolar connection and the bipolar connection on the high rotation speed mode and the low rotation speed mode, respectively.

However, it is difficult to control the number of revolutions of the spindle motor 100 in a stable and at a high precision only when the connection of the three-phase coils of the spindle motor 100 is switched although the necessary torque maybe obtained. Accordingly, the motor drive 60 according to this invention controls the number of revolutions of the spindle motor 100 in each rotation speed mode a stable manner and at the high precision by detecting the number of revolution of the spindle motor 100 by the FG pattern 132 and by using feedback control. In other words, it is possible for the high-density/low-density compatible type FDD to restrain fluctuations in the number of revolutions of the spindle motor 100 in each rotation speed mode with 0.2%.

Referring to FIGS. 1 through 5, the description will proceed to operation of the high-density/low-density compatible type FDD provided with the motor drive 60 illustrated in FIG. 5.

Description will at first proceed to operation of the high-density/low-density compatible type FDD illustrated in FIG. 1 in a case of rotatably driving the magnetic recording medium 41 of the large-capacity FD 40 (FIGS. 3A and 3B) with the large-capacity FD 40 loaded in the high-density/low-density compatible type FDD. When the large-capacity FD 40 is loaded in the high-density/low-density compatible type FDD, the top end 71a of the eject lever 71 ie engaged the upper end 47b of the right side edge of the shutter 47. With the movement of the large-capacity FD 40, the lever unit 70 is rotated in the clockwise direction. Consequently, the shutter 47 is forced by the top end 71a of the eject lever 71 to make sliding movement in the direction depicted by the arrow E.

Subsequently, the disk holder unit holding the large-capacity FD 40 descends and then the large-capacity FD 40 is loaded with a load downwards. As a result, the disk hub 43 of the large-capacity FD 40 is mechanically in contact with the disk holder table 12 with the spindle shaft 104 of the spindle motor 100 freely received in the disk center hole 43a bored in the disk hub 43 of the large-capacity FD 40 and then the magnetic recording medium 41 of the large-capacity FD 40 is put between the pair of the magnetic heads. At the same time, the switch unit 50 detects that the loaded FD is the large-capacity FD 40 and then supplies the logic circuit 61 with the detected signal indicative of detection of the large-capacity FD 40.

Responsive to the detected signal, the logic circuit 61 determines that the loaded FD is the large-capacity FD 40 and then delivers the high speed selection signal $S_H$ to the the phase-locked loop circuit 631 and the mode selection circuit 633. Responsive to the high speed selection signal $S_H$, the mode selection circuit 633 turns the speed switching device 134 on to make the connection of the three-phase coils 124 the unipoler connection and to supply the driving transistor 632 with the mode selection signal indicative of the high speed rotation mode. As a result, a combination of the phase-locked loop circuit 631 and the driving transistor 632 in the spindle motor driver 63 drives the spindle motor 100 so as to rotate at the high rotation speed of 3,600 rpm.

Description will proceed to operation of the high-density/low-density compatible type FDD illustrated in FIG. 1 in another case of rotatably driving the magnetic recording medium of the small-capacity FD with the small-capacity FD loaded in the high-density/low-density compatible type FDD. In this event, the switch unit 50 detects that the loaded FD is the small-capacity FD and then supplies the logic circuit 61 with the detected signal indicative of detection of the small-capacity FD.

Responsive to the detected signal, the logic circuit 61 determines that the loaded FD is the small-capacity FD and then delivers the low speed selection signal $S_L$ to the the phase-locked loop circuit 631 and the mode selection circuit 633. Responsive to the low speed selection signal $S_L$, the mode selection circuit 633 turns the speed switching device 134 off to make the connection of the three-phase coils 124 the bipoler connection and to supply the driving transistor 632 with the mode selection signal indicative of the low speed rotation mode. As a result, the combination of the phase-locked loop circuit 631 and the driving transistor 632 in the spindle motor driver 63 drives the spindle motor 100 so as to rotate at the low rotation speed of 300 rpm or 360 rpm.

Although switching of the rotation speed in the spindle motor 100 is carried out by switching a dividing number in the PLL circuit 631 in the example being illustrated, the switching of the rotation speed in the spindle motor 100 may be carried out by switching of clock frequencies of the clock oscillator 62. In addition, the spindle motor driver 63 may comprise two PLL circuits, namely, a first PLL circuit for the low rotation speed and a second PLL circuit for the high rotation speed and may select one of the two PLL circuits by switching from one to another.

Figure 7:
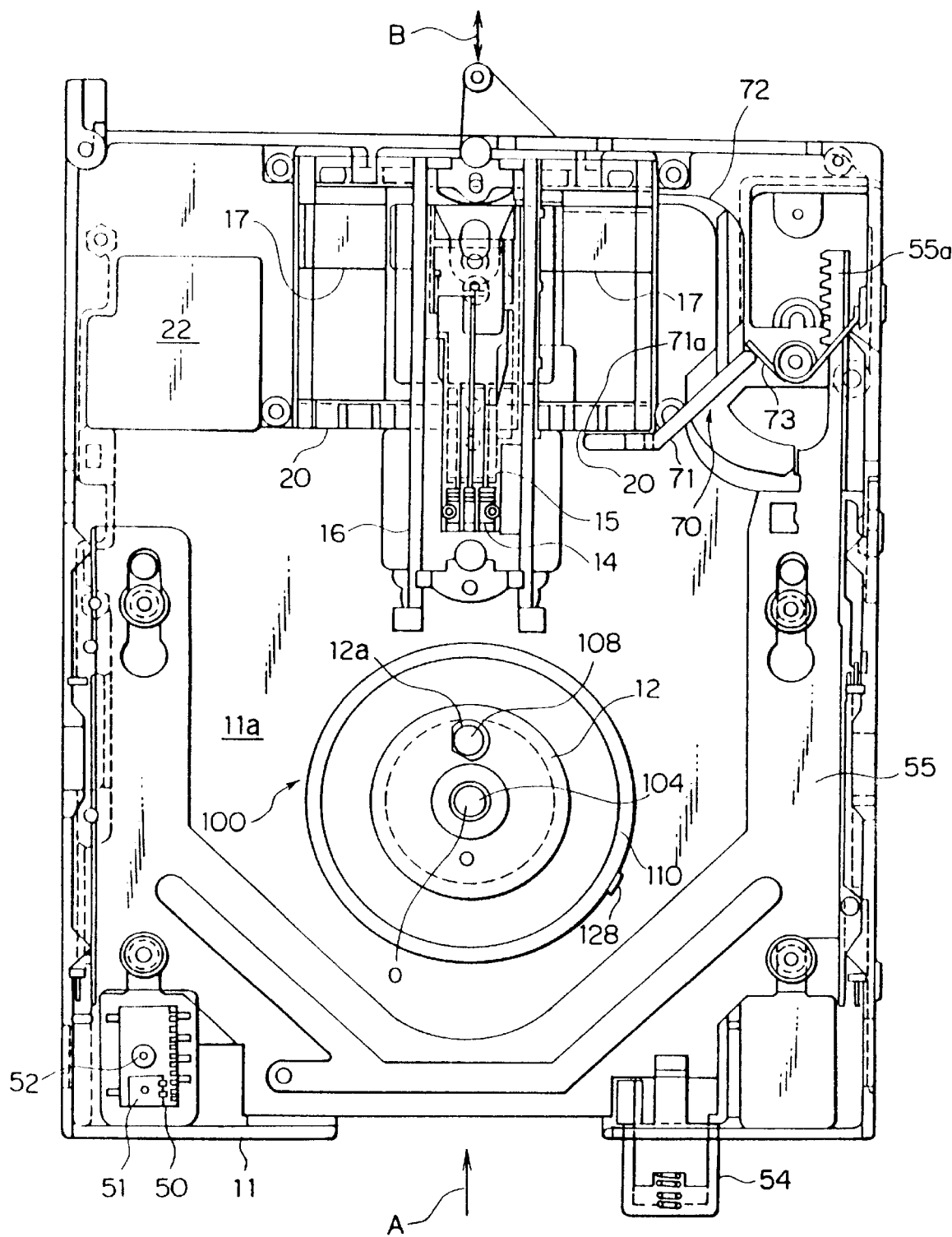
FIG. 7 is a plan view of another high-density type FDD to which this invention is applicable.

Referring to FIG. 7, description will proceed to another high-density type FDD to which this invention is applicable. The illustrated high-density type FDD is similar in structure to that illustrated in FIG. 1 except that the switch unit is modified to different from that described in conjunction with FIG. 1 as will later become clear. The switch unit is therefore depicted at 50A. The switch unit 50A comprises, as the push switches, the write control switch 51 and the large-capacity detecting switch 52 alone. In other words, the type detecting switch 53 is omitted from the switch unit 50 illustrated in FIG. 1.

Figure 8A:
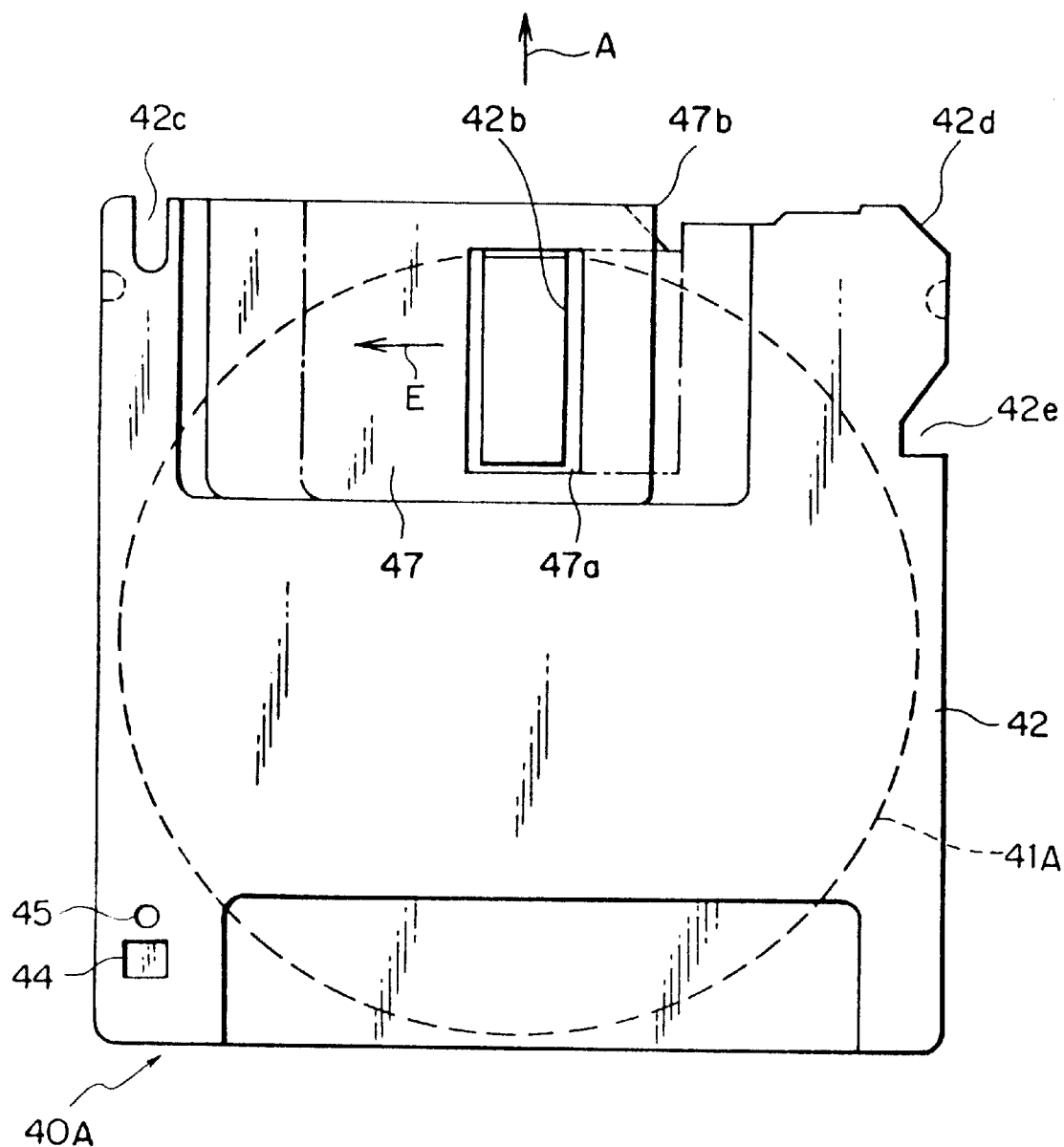
FIGS. 8A and 8B collectively show another large-capacity FD loaded in the high-density type FDD illustrated in FIG. 7.
Figure 8B:
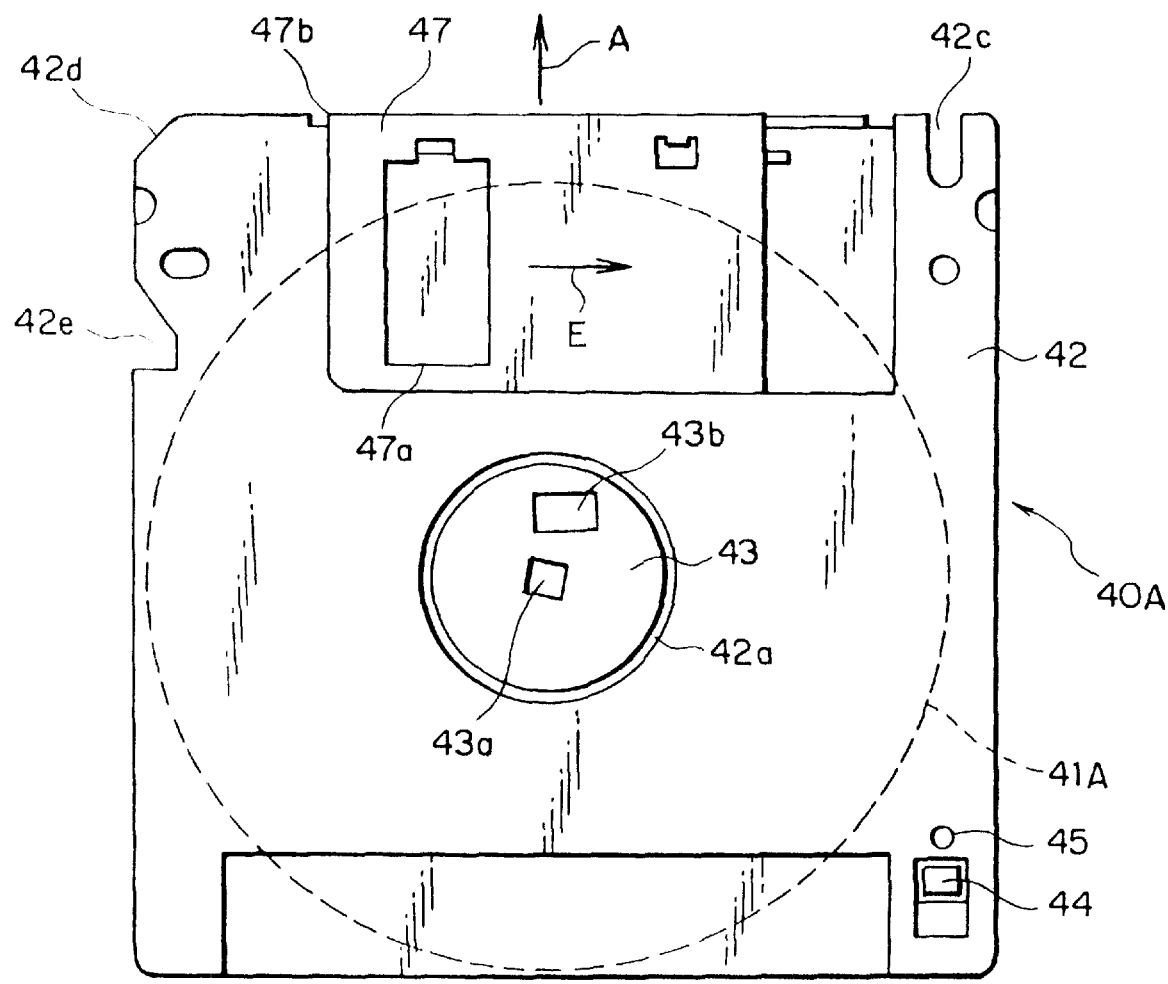

Turning to FIGS. 8A and 8B, description will proceed to another large-capacity FD 40A which is loaded in the high-density type FDD illustrated FIG. 7. The illustrated large-capacity FD 40A is similar in structure to that illustrated in FIGS. 3A and 3B except that the type identifier hole 46 is omitted from the large-capacity FD 40 illustrated in FIGS. 3A and 3B.

Figure 9:
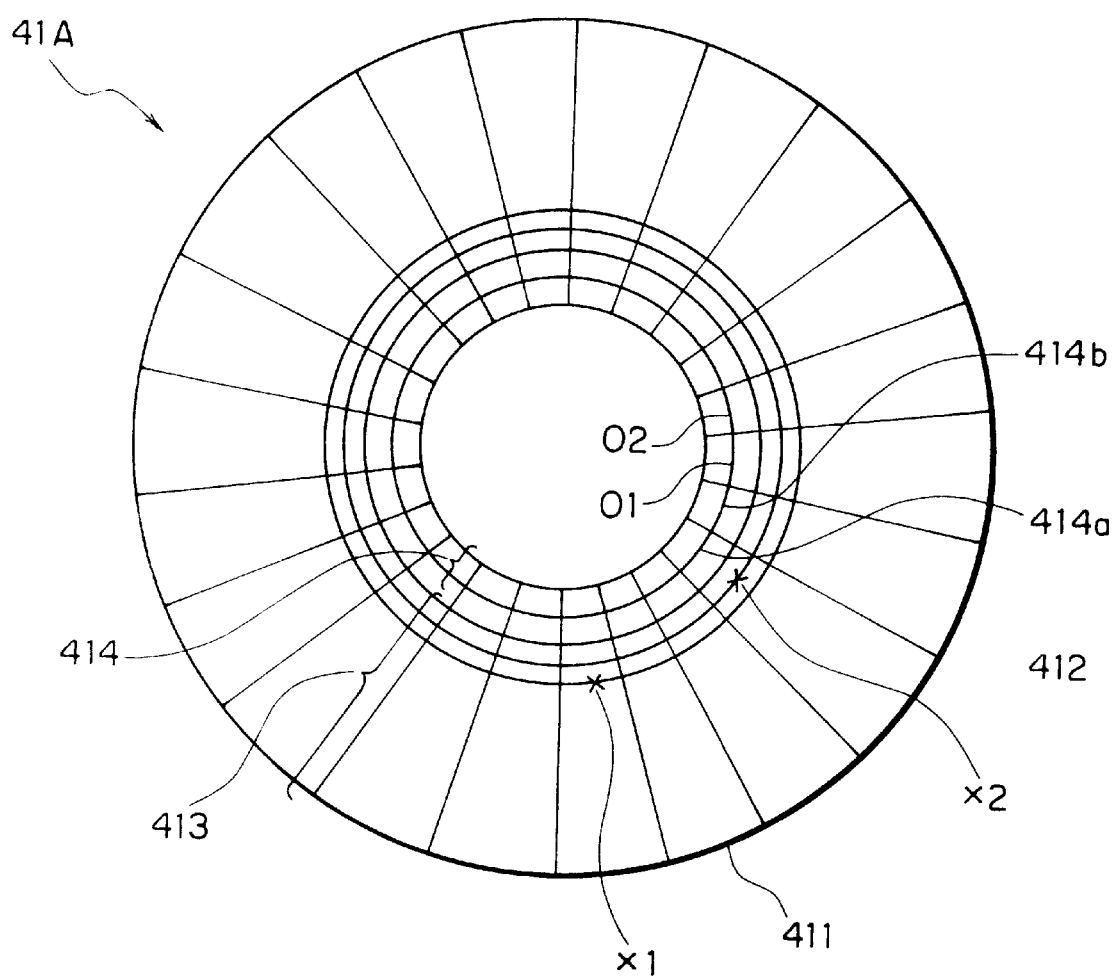
FIG. 9 is a plan view of a magnetic recording medium for use in the large-capacity FD illustrated in FIGS. 8A and 8B.

Turning to FIG. 9, description will proceed to a magnetic recording medium received in the shell 42 of the large-capacity FD 40A. The magnetic recording medium for the large-capacity FD 40A is modified to different from the magnetic recording medium 41 for the large-capacity FD 40 as will later become clear. The magnetic recording medium is therefore depicted at 41A.

The magnetic recording medium 41A comprises a plurality of tracks 411 thereon which are arranged with concentric circles around a center of rotation thereof. The tracks 411 may be arranged with a spiral fashion around the center of rotation thereof. Each track 411 is divided in a circumferential direction into a predetermined number of sectors 412 having a length equal to one another. It is assumed that the large-capacity FD 40A has the storage capacity of 128 Mbytes. In this event, the large-capacity FD 40A or the magnetic recording medium 41A comprises the tracks 411 which are equal in total number and in available total number to 1,866 and 1,564 each side, respectively. Each track 411 is divided into the sectors 412 which are equal in number to 80. The large-capacity FD 40A has a medium storage capacity of about 160 Mbytes in all both sides and has a format storage capacity of about 128 Mbyte in all both sides. That is, a physical formatting for the magnetic recording medium 41A arranges the tracks 411 thereon with concentric circles that equal in number to 1,564 on one side and divides each track 411 into the sectors 412 which are equal in number to 80. Each sector 412 consists of a servo field (not shown) and a data field (not shown).

In addition, the magnetic recording medium 41A has a medium rotation speed of 3,600 rpm. I this connection, the a magnetic recording medium of the small-capacity FD has a medium rotation speed of 300 or 360 rpm. That is, the medium rotation speed of the large-capacity FD 40A is twelve or ten times as large as that of the small-capacity FD.

As shown in FIG. 9, the tracks 411 on the magnetic recording medium 41A are separated into a user data area 413 available to a user and an alternate area 414 other than the user data area 413. The alternate area 413 is disposed in the magnetic recording medium 41A in a radial direction inward as shown in FIG. 9. The alternate area 414 may be disposed in the magnetic recording medium 41A in the radial direction outward.

The alternate area 414 of the magnetic recording medium 41A is provided not only with a predetermined sector 414a for storing a defective map (which will later become clear) but also with an information identification sector 414b for storing capacity information indicative of the storage capacity of the magnetic recording medium 41A. In this connection, an alternate area of the magnetic recording medium 41 for the large-capacity FD 40 illustrated in FIGS. 3A and 3B is provided only with the predetermined sector 414a for storing the defective map.

It is presumed that the large-capacity FD 40A is loaded in the high-density type FDD illustrated in FIG. 8. In this event, the high-density type FDD can detect, in response to a detection signal from the switch unit 50A, that the loaded FD is the large-capacity FD 40A. Thereafter, the high-density type FDD can detect the type of the loaded large-capacity FD 40A, namely, the storage capacity of the loaded large-capacity FD 40A by reading the capacity information out of the information identification sector 414b by the magnetic head thereof.

It is assumed that the high-density type FDD illustrated in FIG. 7 is the double-density large-capacity FDD and the loaded large-capacity FD 40A is the single-density large-capacity FD. Under the circumstances, the double-density large-capacity FDD can control so as to carry out reproduction of the single-density large-capacity FD alone by detecting the storage capacity of the loaded large-capacity FD 40A in the manner which is described above.

Although the predetermined sector 414a and the information identification sector 414b are apart from each other in the above-mentioned embodiment, both of the defective map and the capacity information may be stored in the same sector. In other words, the information identification sector 414b may share the predetermined sector 414a. That is, the predetermined sector 414a may serve as the information identification sector 414b also.

In the example being illustrated, it is assumed that there is defective sectors depicted at x1, x2, . . . and so on as shown in FIG. 9. In this event, a media formatter (not shown) performs test of sector format to detects the detective sectors on on the user data area 413 and carries out rearrangement of the sectors 412 except for the defective sectors. In the example being illustrated, the media formatter carries out rearrangement of the sectors ST so that the defective sectors x1 and x2 are alternated by alternate sectors depicted at 01 and 02 in the alternate area 414, respectively. Thereafter, the media formatter prepares the defective map which is a table for entering information indicating where the defective sectors on the user data area 413 are arranged to which alternate sectors in the alternate area 414. The defective map is stored in the predetermined sector 414b in the alternate area 414. If the storage capacity of the magnetic recording medium 41A formatted is less than a predetermined specification storage capacity due to the presence of a lot of defective sectors, the formatted magnetic recording medium 41A is discarded because the formatted magnetic recording medium 41A cannot be used. Finally, the media formatter writes the capacity information indicative of the storage capacity of the magnetic recording medium 41A in the information identification sector 414b in the alternate area 414.

Figure 10:
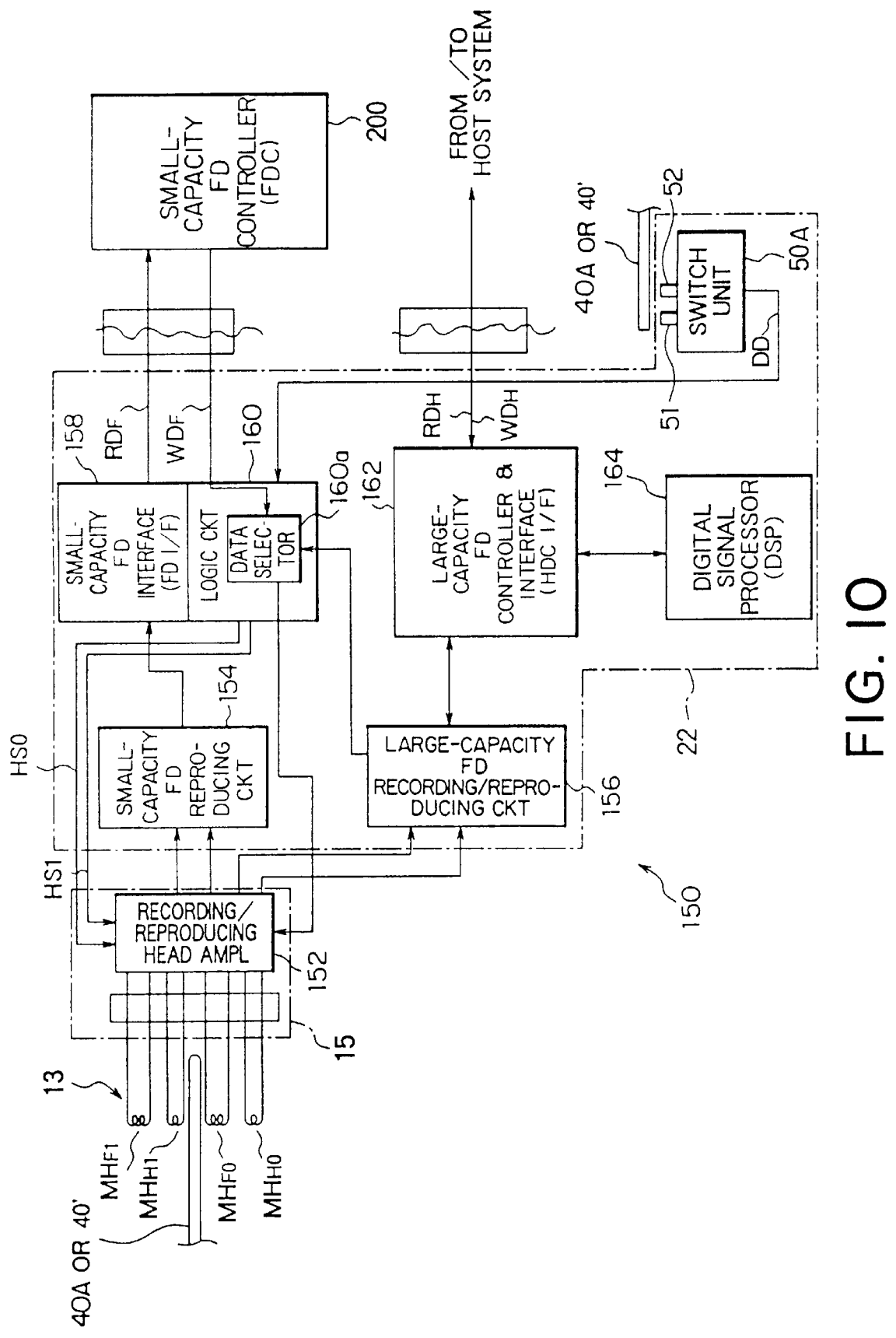

Turning to FIG. 10, description will proceed to a signal system 150 for use in the high-density/low-density compatible type FDD illustrated in FIG. 7. As shown in FIG. 10, the high-density/low-density compatible type FDD is provided with, as the magnetic heads depicted at 13, an upper low-density magnetic head $MH_{F1}$, an upper high-density magnetic head $MH_{H1}$, a lower low-density magnetic head $MH_{F0}$, and a lower high-density magnetic head $MH_{H0}$. Those magnetic heads $MH_{F1}$, $MH_{F0}$, $MH_{H1}$, and $MH_{H0}$ are supported by the carriage 15 (FIG. 7).

In a case when data recording/reproducing is carried out with respect to the magnetic disk medium of the small-capacity FD depicted at 40', low-density write-in data $WD_F$ is supplied from a small-capacity FD controller (FDC) 200 and low-density read-out data $RD_F$ is delivered to the small-capacity FD controller 200. On the other hand, in a case when data recording/reproducing is carried out with respect to the magnetic disk medium 41A (FIG. 9) of the large-capacity FD 40A (FIGS. 8A and 8B), high-density write-in data $WD_H$ is supplied from a host system (not shown) and high-density read-out data $RD_H$ is delivered to the host system.

The illustrated signal system 150 for the high-density/low-density compatible type FDD comprises a recording/reproducing head amplifier 152, a small-capacity FD reproducing circuit 154, a large-capacity FD recording/reproducing circuit 156, a small-capacity FD interface (FD I/F) 158, a logic circuit 160, a large-capacity FD controller and interface (HDC I/F) 162, and a digital signal processor (DSP) 164. The logic circuit 160 includes a data selector 160a.

The recording/reproducing head amplifier 152 is mounted on the carriage 15 (FIG. 7) for supporting the low-density magnetic heads $MH_{F1}$ and $MH_{F0}$ and the high-density magnetic heads $MH_{H1}$ and $MH_{H0}$. The recording/reproducing head amplifier 152 amplifies data read by the low-density magnetic heads $MH_{F1}$ and $MH_{F0}$ and the high-density magnetic heads $MH_{H1}$ and $MH_{H0}$ to produce low-density read amplified data and high-density read amplified data, respectively. In addition, the recording/reproducing head amplifier 152 supplies writing amplified data to the low-density magnetic heads $MH_{F1}$ and $MH_{F0}$ and the high-density magnetic heads $MH_{H1}$ and $MH_{H0}$.

The small-capacity flexible disk reproducing circuit 154 and the large-capacity flexible disk recording/reproducing circuit 156 are mounted on the printed-circuit board 22 (FIG. 7) and are connected to the recording/reproducing head amplifier 152. The small-capacity FD reproducing circuit 154 serves as a low-density reproducing circuit for reproducing the low-density read amplified data in accordance with an MFM (modified frequency modulation) modulation/demodulation system. The large-capacity FD recording/reproducing circuit 156 acts as a high-density reproducing circuit for reproducing the high-density read amplified data in accordance with a 1–7 RLL (run length limited code) modulation/demodulation system. In addition, the large-capacity FD recording/reproducing circuit 156 modulates the high-density write-in data $WD_H$ from the large-capacity FD controller and interface 162 in accordance with the 1–7 RLL modulation/demodulation system to deliver modulated data to the data selector 160a.

Reproduced by the small-capacity FD disk reproducing circuit 154, data is delivered as the low-density write-in data $WD_F$ to the small-capacity FD controller 200 through the small-capacity FD interface 158. On the other hand, supplied from the small-capacity FD controller 200, the low-density write-in data $WD_F$ is delivered to the recording/reproducing head amplifier 152 through the data selector 160a.

Reproduced by the large-capacity FD recording/reproducing circuit 156, data is delivered as the high-density read-out data $RD_H$ to the host system through the large-capacity FD controller and interface 162. On the other hand, supplied from the host system, the high-density write-in data $WD_H$ is delivered to the large-capacity FD recording/reproducing circuit 156 through the large-capacity FD controller and interface 162, modulated by the large-capacity FD recording/reproducing circuit 156 in accordance with the 1–7 RLL modulation/demodulation system, and thereafter delivered to the recording/reproducing head amplifier 152 through the data selector 160a.

The data selector 160a in the logic circuit 160 is supplied from the switch unit 50A with an identification detected signal DD indicating whether the FD loaded in the high-density/low-density compatible type FDD is the large-capacity FD 40A or the small-capacity FD 40'. When the identification detected signal DD indicates detection of the small-capacity FD 40', the data selector 160a selects the low-density write-in data $WD_F$ from the low-capacity flexible disk controller 200 to deliver it to the recording/reproducing head amplifier 152. On the other hand, when the identification detected signal DD indicates detection of the large-capacity FD 40A, the data selector 160a selects the modulated data from the large-capacity FD recording/reproducing circuit 156 to deliver it to the recording/reproducing head amplifier 152.

Responsive to the identification detected signal DD, the logic circuit 160 delivers first and second head selection signals HS1 and HS0 to the recording/reproducing head amplifier 152. The first head selection signal HS1 is a signal indicative of selecting either the upper magnetic heads $MH_{H1}$ and $MH_{F1}$ or the lower magnetic heads $MH_{H0}$ and $MH_{F0}$. The first head selection signal HS1 indicates selection of the upper magnetic heads $MH_{H1}$ and $MH_{F1}$ when the first head selection signal HS1 takes a logic "0" level. When the first head selection signal HS1 takes a logic "1" level, the first head selection signal HS1 indicates selection of the lower magnetic heads $MH_{H0}$ and $MH_{F0}$. On the other hand, the second head selection signal HS0 is a signal indicative of selecting either the low-density magnetic heads $MH_{F1}$ and $MH_{F0}$ or the high-density magnetic heads $MH_{H1}$ and $MH_{H0}$. The second selection signal HS0 takes the logic "0" level to indicate selection of the high-density magnetic heads $MH_{H1}$ and $MH_{H0}$ when the identification detected signal DD indicates detection of the large-capacity FD 40A. When the identification detected signal DD indicates detection of the small-capacity FD 40', the second selection signal HS0 takes the logic "1" level to indicate selection of the low-density magnetic heads $MH_{F1}$ and $MH_{F0}$.

It is assumed that the identification detected signal DD indicates detection of the large-capacity FD 40A. In this event, the high-density magnetic heads $MH_{H1}$ and $MH_{H0}$ read the capacity information out of the information identification sector 414b on the magnetic recording medium 41A of the large-capacity FD 40A. The readout capacity information is amplified by the recording/reproducing head amplifier 152, reproduced by the large-capacity FD recording/reproducing circuit 156, and delivered to the large-capacity FD controller and interface 162. It is possible for the large-capacity FD controller and interface 162 to recognize the storage capacity of the large-capacity FD 40A on the basis of the delivered capacity information. As a result, it is possible for the high-density/low-density compatible type FDD illustrated in FIG. 7 to carry out control so as to match with the storage capacity of the large-capacity FD 40A loaded therein. At any rate, a combination of the magnetic heads 13 (the high-density magnetic heads $MH_{H1}$ and $MH_{H0}$), the recording/reproducing head amplifier 152, the large-capacity FD recording/reproducing circuit 156, and the large-capacity FD controller and interface 162 serves as an arrangement for reading the capacity information out of a specific sector or the information identification sector 414b on the magnetic recording medium 41A of the large-capacity FD 40A and for recognizing the storage capacity of the large-capacity FD 40A on the basis of the readout capacity information.

In addition, the large-capacity FD controller and interface 162 is controlled by the digital signal processor 164.

While this invention has thus far been described in conjunction with a few preferred embodiments thereof, it will now be readily possible for those skilled in the art to put this invention into various other forms. For example, this invention may be applicable to other removable type magnetic recording/reproducing devices although the above-mentioned embodiments are applied to the high-density type FDDs.

What is claimed is:

1. A motor drive for driving a motor having three-phase coils in both a high rotation speed mode in which said motor rotates at a high rotation speed and a low rotation speed mode in which said motor rotates at a low rotation speed which is extremely lower than the high rotation speed, said motor drive comprising:

a logic circuit for selectively producing, in response to a detected signal from a switch unit, one of a low speed selection signal and a high speed selection signal, said low speed selection signal being a signal indicative of making said motor rotate at the low rotation speed, said high speed selection signal being a signal indicative of making said motor rotate at the high rotation speed;

a clock oscillator for oscillating a clock signal having a clock frequency;

rotation speed detecting means for detecting a rotation speed of said motor to produce a speed detected signal;

a phase-locked loop circuit connected to said logic circuit, said clock oscillator, and said rotation speed detecting means, said phase-locked loop circuit including a frequency divider for frequency dividing the clock signal, said frequency divider frequency dividing, in response to the low speed selection signal, the clock signal into a divided signal having a divided frequency corresponding to the low rotation speed, said frequency divider frequency dividing, in response to the high speed selection signal, the clock signal into the divided signal having the divided frequency corresponding to the high rotation speed, said phase-locked loop circuit detecting a phase difference between the speed detected signal and the divided signal to produce a control signal indicative of the phase difference;

a speed switching device connected to a common connection terminal of said three-phase coils;

a mode selection circuit connected to said logic circuit and said speed switching device, said mode selection circuit turning, in response to the low speed selection signal, said speed switching device off to make said three-phase coils the bipolar connection, said mode selection circuit turning, in response to the high speed selection signal, said speed switching device on to make said three-phase coils the unipolar connection, said mode selection circuit producing, in response to the low speed selection signal, a mode selection signal indicative of the low rotation speed mode, said mode selection circuit producing, in response to the high speed selection signal, the mode selection signal indicative of the high rotation speed mode; and a driving transistor, connected to said phase-locked loop circuit, said mode selection circuit, and said three-phase coils, for driving, on the basis of the control signal and the mode selection signal, said motor so that a frequency of the speed detected signal coincides with the divided frequency of the divided signal, thereby controlling a number of revolutions of said motor in each rotation speed mode in a stable manner and with high precision by using feedback control.

2. A motor drive as claimed in claim 1, wherein said rotation speed detecting means comprises a frequency generation pattern formed on a stator of said motor.

3. A motor drive as claimed in claim 1, wherein said high rotation speed is a rotation speed at least ten times faster than the low rotation speed.

4. A motor drive as claimed in claim 3, wherein the high rotation speed is 3,600 rpm, the low rotation speed is 300 rpm, and said motor drive drives said motor such that the motor has a torque of about 25 g-cm at 3,600 rpm and about 65 g-cm at 300 rpm.

5. A motor drive as claimed in claim 3, wherein the high rotation speed is 3,600 rpm, and the low rotation speed is 360 rpm.

6. A motor drive as claimed in claim 1, wherein said motor is a spindle motor.

7. A motor drive as claimed in claim 1, wherein said motor drive drives said motor such that the motor has a torque of at least 14 g-cm in the high rotation speed mode and a torque of at least 60 g-cm in the low rotation speed mode.

8. A motor drive as claimed in claim 1, wherein said motor drive restrains fluctuations in the number of revolutions of said motor in each rotation speed mode to within 0.2%.

9. In a high-density/low-density compatible type flexible disk drive for carrying out data recording and reproducing operations to and from disk-shaped magnetic recording media of both a large-capacity disk and a small-capacity flexible disk, wherein the magnetic recording medium of the large-capacity flexible disk is required to rotate at a high rotation speed on recording and reproducing and the magnetic recording medium of the small-capacity flexible disk is required to rotate at a low rotation speed which is lower than the high rotation speed on recording and reproducing, and wherein said high-density/low-density compatible type flexible disk drive comprises a motor having three-phase coils for driving the magnetic disk media of both the large-capacity disk and the small-capacity flexible disk and a motor drive for driving said motor in both a high rotation speed mode in which said motor rotates at the high rotation speed and a low rotation speed mode in which said motor rotates at the low rotation speed, said motor drive comprises:

a logic circuit for selectively producing, in response to a detected signal from a switch unit, one of a low speed selection signal and a high speed selection signal, said low speed selection signal being a signal indicative of making said motor rotate at the low rotation speed, said high speed selection signal being a signal indicative of making said motor rotate at the high rotation speed;

a clock oscillator for oscillating a clock signal having a clock frequency;

rotation speed detecting means for detecting a rotation speed of said motor to produce a speed detected signal;

a phase-locked loop circuit connected to said logic circuit, said clock oscillator, and said rotation speed detecting means, said phase-locked loop circuit including a frequency divider for frequency dividing the clock signal, said frequency divider frequency dividing, in response to the low speed selection signal, the clock signal into a divided signal having a divided frequency corresponding to the low rotation speed, said frequency divider frequency dividing, in response to the high speed selection signal, the clock signal into the divided signal having the divided frequency corresponding to the high rotation speed, said phase-locked loop circuit detecting a phase difference between the speed detected signal and the divided signal to produce a control signal indicative of the phase difference;

a speed switching device connected to a common connection terminal of said three-phase coils;

a mode selection circuit connected to said logic circuit and said speed switching device, said mode selection circuit turning, in response to the low speed selection signal, said speed switching device off to make said three-phase coils the bipolar connection, said mode selection circuit turning, in response to the high speed selection signal, said speed switching device on to make said three-phase coils the unipolar connection, said mode selection circuit producing, in response to the low speed selection signal, a mode selection signal indicative of the low rotation speed mode, said mode selection circuit producing, in response to the high speed selection signal, the mode selection signal indicative of the high rotation speed mode; and a driving transistor, connected to said phase-locked loop circuit, said mode selection circuit, and said three-phase coils, for driving, on the basis of the control signal and the mode selection signal, said motor so that a frequency of the speed detected signal coincides with the divided frequency of the divided signal, thereby controlling a number of revolutions of said motor in each rotation speed mode in a stable manner and with high precision by using feedback control.

10. A high-density/low-density compatible type flexible disk drive as claimed in claim 9, wherein said rotation speed detecting means comprises a frequency generation pattern formed on a stator of said motor.

11. A high-density/low-density compatible type flexible disk drive as claimed in claim 9, wherein said high rotation speed is a rotation speed at least ten times faster than the low rotation speed.

12. A high-density/low-density compatible type flexible disk drive as claimed in claim 11, wherein the high rotation speed is 3,600 rpm, the low rotation speed is 300 rpm, said motor drive drives said motor such that the motor has a the torque of about 25 g-cm at 3,600 rpm and about 65 g-cm at 300 rpm.

13. A high-density/low-density compatible type flexible disk drive as claimed in claim 11, wherein the high rotation speed is 3,600 rpm, and the low rotation speed is 360 rpm.

14. A high-density/low-density compatible type flexible disk drive as claimed in claim 9, wherein said motor is a spindle motor.

15. A high-density/low-density compatible type flexible disk drive as claimed in claim 9, wherein said motor drive drives said motor such that the motor has a torque of at least 14 g-cm in the high rotation speed mode and a torque of at least 60 g-cm in the low rotation speed mode.

16. A high-density/low-density compatible type flexible disk drive as claimed in claim 9, wherein said motor drive restrains fluctuations in the number of revolutions of said motor in each rotation speed mode to within 0.2%.

* * * * *